US008672534B2

(12) United States Patent
Nevarez et al.

(10) Patent No.: US 8,672,534 B2
(45) **Date of Patent: *Mar. 18, 2014**

(54) INTEGRATED MIXING AND CLEANING BEVERAGE ASSEMBLY AND METHOD THEREOF

(75) Inventors: Roberto Nevarez, Hudson, FL (US); William E. Smith, Land O'Lakes, FL (US); Jan Claesson, Land O'Lakes, FL (US)

(73) Assignee: Enodis Corporation, New Port Richey, FL (US)

(*) Notice: Subject to any disclaimer, the term of this patent is extended or adjusted under 35 U.S.C. 154(b) by 840 days.

This patent is subject to a terminal disclaimer.

(21) Appl. No.: 12/633,766

(22) Filed: Dec. 8, 2009

(65) Prior Publication Data

US 2010/0323071 A1 Dec. 23, 2010

Related U.S. Application Data

(60) Provisional application No. 61/120,772, filed on Dec. 8, 2008.

(51) Int. Cl.
*A47J 43/044* (2006.01)

(52) U.S. Cl.
USPC .......... 366/206; 366/197

(58) Field of Classification Search
USPC .......... 366/138, 197, 206
See application file for complete search history.

(56) References Cited

U.S. PATENT DOCUMENTS 1,592,788 A * 7/1926 Supervielle .......... 366/138
2,008,106 A 7/1935 Lawrence .......... 366/197
2,653,733 A 9/1953 Rudd et al. .......... 222/145
2,855,007 A 10/1958 Erickson et al. .......... 99/275
3,101,872 A 8/1963 Dickinson .......... 222/197
3,154,123 A 10/1964 Tomlinson .......... 241/101.6
3,156,103 A 11/1964 Ross .......... 62/331
3,295,997 A 1/1967 Tomlinson et al. .......... 241/34
3,365,177 A * 1/1968 Daman .......... 366/138
3,505,075 A 4/1970 Black
3,592,367 A 7/1971 Landis et al.
3,615,673 A 10/1971 Black et al. .......... 99/79
3,630,045 A 12/1971 Lunde .......... 62/320
3,704,599 A 12/1972 Darby et al. .......... 62/354

(Continued)

FOREIGN PATENT DOCUMENTS

EP 0176259 B1 1/1990
EP 1690481 8/2006

(Continued)

OTHER PUBLICATIONS

International Search Report from the corresponding International Application No. PCT/US2009/067227 dated Feb. 17, 2010.

(Continued)

*Primary Examiner* — David Sorkin

(74) *Attorney, Agent, or Firm* — Ohlandt, Greeley, Ruggiero & Perle, LLP

(57) ABSTRACT

An integrated beverage dispensing and cleaning system comprising: at least one blender module which blends and/or mixes ice, at least one other ingredient, and/or at least one mixin within a beverage container, thereby producing the beverage; and a cleaning assembly integrated with the blender module, wherein, upon removal of the beverage container from the blender module, a cleaning mode is initiated.

19 Claims, 23 Drawing Sheets

(56) References Cited

U.S. PATENT DOCUMENTS

| | | | | |
|---|---|---|---|---|
| 3,987,211 | A | 10/1976 | Dunn et al. | 426/551 |
| 4,083,462 | A | 4/1978 | Teske et al. | 214/17 D |
| 4,276,750 | A | 7/1981 | Kawasumi | 62/137 |
| 4,392,588 | A | 7/1983 | Scalera | 222/129.4 |
| 4,458,735 | A * | 7/1984 | Houman | 141/95 |
| 4,531,380 | A | 7/1985 | Hagen | 62/320 |
| 4,590,975 | A | 5/1986 | Credle, Jr. | |
| 4,610,145 | A | 9/1986 | Arzberger et al. | 62/127 |
| 4,638,875 | A | 1/1987 | Murray | 177/1 |
| 4,653,281 | A | 3/1987 | Van Der Veer | 62/71 |
| 4,681,030 | A | 7/1987 | Herbert | 99/484 |
| 4,708,487 | A | 11/1987 | Marshall | 366/206 |
| 4,745,773 | A | 5/1988 | Ando | 62/320 |
| 4,790,240 | A | 12/1988 | Henn et al. | 99/282 |
| 4,932,223 | A | 6/1990 | Paul et al. | 62/354 |
| 4,941,593 | A | 7/1990 | Hicks et al. | 222/148 |
| 4,962,866 | A | 10/1990 | Phillips | 221/8 |
| 5,036,892 | A | 8/1991 | Stembridge et al. | 62/1 |
| 5,067,819 | A | 11/1991 | Heinhold et al. | 366/138 |
| 5,068,116 | A | 11/1991 | Gibney et al. | 426/231 |
| 5,104,007 | A | 4/1992 | Utter | 222/146.6 |
| 5,192,131 | A | 3/1993 | Hatfield | 366/308 |
| 5,208,050 | A | 5/1993 | Ney | 425/202 |
| 5,280,845 | A | 1/1994 | Leight | 221/2 |
| 5,323,691 | A | 6/1994 | Reese et al. | 99/275 |
| 5,350,082 | A | 9/1994 | Kiriakides et al. | 141/1 |
| 5,439,289 | A | 8/1995 | Neilson | 366/207 |
| 5,549,219 | A | 8/1996 | Lancaster | 221/1 |
| 5,619,901 | A | 4/1997 | Reese et al. | 99/275 |
| 5,683,011 | A | 11/1997 | Miliani | 222/56 |
| 5,690,253 | A | 11/1997 | LaFleur | 222/102 |
| 5,698,247 | A | 12/1997 | Hall | 426/66 |
| 5,778,761 | A | 7/1998 | Miller | 99/275 |
| 5,797,519 | A | 8/1998 | Schroeder et al. | 222/129.1 |
| 5,803,377 | A | 9/1998 | Farrell | 241/36 |
| 5,833,362 | A | 11/1998 | Shepard | 366/111 |
| 5,839,291 | A | 11/1998 | Chang | 62/126 |
| 5,863,118 | A | 1/1999 | Ackels et al. | 366/129 |
| 5,910,164 | A | 6/1999 | Snelling et al. | 62/344 |
| 5,911,749 | A | 6/1999 | Sugie | 62/354 |
| 5,934,516 | A | 8/1999 | Strycharske et al. | 222/158 |
| 5,960,701 | A | 10/1999 | Reese et al. | 99/275 |
| 5,967,367 | A | 10/1999 | Orsborn | 222/30 |
| 6,068,875 | A | 5/2000 | Miller et al. | 426/565 |
| 6,196,712 | B1 | 3/2001 | Elm | 366/197 |
| 6,202,894 | B1 | 3/2001 | Struminski et al. | 222/129.3 |
| 6,269,973 | B1 | 8/2001 | Bennett et al. | 221/1 |
| 6,283,627 | B1 | 9/2001 | Fromm | 366/260 |
| 6,293,691 | B1 | 9/2001 | Rebordosa et al. | 366/129 |
| 6,338,569 | B1 | 1/2002 | McGill | 366/144 |
| 6,490,872 | B1 | 12/2002 | Beck et al. | 62/303 |
| 6,607,096 | B2 | 8/2003 | Glass et al. | 222/100 |
| 6,609,821 | B2 | 8/2003 | Wulf et al. | |
| 6,616,323 | B2 | 9/2003 | McGill | 366/201 |
| 6,684,646 | B2 | 2/2004 | Vouté et al. | 62/66 |
| 6,705,356 | B2 | 3/2004 | Barton et al. | 141/2 |
| 6,722,675 | B2 | 4/2004 | Bidwell | 280/89 |
| 6,730,348 | B2 | 5/2004 | Miller et al. | 426/565 |
| 6,772,675 | B2 | 8/2004 | Ervin | 99/275 |
| 6,889,603 | B2 | 5/2005 | Carhuff et al. | |
| 6,945,157 | B2 | 9/2005 | Brown et al. | 99/275 |
| D526,170 | S | 8/2006 | Gugni | 7/706 |
| 7,175,046 | B2 | 2/2007 | Yao | 221/265 |
| 7,207,506 | B1 | 4/2007 | Dickson, Jr. et al. | 241/21 |
| 7,237,691 | B2 | 7/2007 | Danby et al. | 222/105 |
| 7,237,692 | B2 | 7/2007 | Bodum | |
| 7,278,275 | B2 | 10/2007 | Voglewede et al. | 62/320 |
| D555,678 | S | 11/2007 | Broersen et al. | 15/89 |
| 7,325,485 | B2 | 2/2008 | Carhuff et al. | |
| 7,383,966 | B2 | 6/2008 | Ziesel | 222/100 |
| 7,475,795 | B2 | 1/2009 | Faller et al. | 222/95 |
| 7,543,346 | B2 | 6/2009 | Roh et al. | |
| 7,614,524 | B2 | 11/2009 | Girard et al. | 222/129.4 |
| 7,748,571 | B2 | 7/2010 | Goff et al. | 222/146.6 |
| 8,459,176 | B2 * | 6/2013 | Nevarez et al. | 99/275 |
| 2002/0194999 | A1 | 12/2002 | Ervin | |
| 2005/0183426 | A1 | 8/2005 | Learned | 426/565 |
| 2005/0242120 | A1 | 11/2005 | Sato et al. | 99/290 |
| 2007/0084888 | A1 | 4/2007 | Santos et al. | 222/631 |
| 2007/0095859 | A1 | 5/2007 | Maser et al. | 222/148 |
| 2007/0205220 | A1 | 9/2007 | Rudick et al. | 222/129.4 |
| 2007/0205221 | A1 | 9/2007 | Carpenter et al. | 222/129.4 |
| 2007/0289991 | A1 | 12/2007 | Jensen | 222/1 |
| 2008/0089983 | A1 | 4/2008 | Coste | 426/106 |
| 2008/0093382 | A1 | 4/2008 | Sher et al. | 222/129.1 |
| 2008/0279040 | A1 | 11/2008 | Neilson | 366/138 |
| 2010/0139493 | A1 | 6/2010 | Nevarez et al. | 99/275 |
| 2010/0145522 | A1 | 6/2010 | Claesson et al. | 700/265 |
| 2010/0318225 | A1 | 12/2010 | Claesson et al. | 700/265 |
| 2010/0323071 | A1 | 12/2010 | Nevarez et al. | 426/231 |

FOREIGN PATENT DOCUMENTS

| | | | |
|---|---|---|---|
| EP | 1 772 081 | A1 | 4/2007 |
| JP | 2004326246 | A | 11/2004 |
| WO | 02/082959 | A2 | 10/2002 |
| WO | 2008/105107 | A1 | 9/2008 |

OTHER PUBLICATIONS

International Search Report issued Dec. 21, 2010 in the related International Application No. PCT/US2010/054317.

Patent Examination Report No. 1 dated Sep. 21, 2012 for corresponding Australian Patent Application No. 2009333465.

English translation of First Office Action dated Aug. 27, 2012 for corresponding Chinese Patent Application No. 200980137971.8.

Extended European Search Report dated Jul. 23, 2012 for corresponding European Patent Application No. 09836740.2.

Extended European Search Report dated Jul. 23, 2012 for corresponding European Patent Application No. 09836743.6.

Extended European Search Report dated Sep. 3, 2012 for European application No. 09832454.4.

Extended European Search Report dated Sep. 3, 2012 for European application No. 09836742.8.

Extended European Search Report dated Sep. 3, 2012 for European application No. 09836741.0.

Chinese Office Action dated Oct. 23, 2012 for Chinese application No. 200980137874.9.

Chinese Office Action dated Oct. 22, 2012 for Chinese application No. 200980137980.7.

Russian Office Action dated Sep. 21, 2012 for Russian application No. 2011127987.

International Preliminary Report on Patentability issued Dec. 15, 2011 in the related PCT/US2010/054317.

International Preliminary Report on Patentability issued Oct. 26, 2011 in the related PCT/US2009/067229.

International Search Report mailed Mar. 2, 2009 in the corresponding PCT/US2009/000247.

Extended European Search Report mailed Dec. 21, 2010 in the corresponding PCT/US2009/000247.

Examiner's Forms 892 issued Sep. 1, 2010 and Jun. 20, 2011 in the related U.S. Appl. No. 12/009,221.

Australian Examination Report dated Jan. 11, 2013 for Australian patent No. 2009324698.

Russian Patent Office action dated Jan. 25, 2013 from corresponding Russian Patent Application No. 2011128012108(041554), pp. 7.

Russian Patent Office action dated Feb. 4, 2013 from corresponding Russian Patent Application No. 2011128014/20(041556), pp. 10.

Australian Patent Office action dated Feb. 11, 2013 from corresponding Australian Patent Application No. 2009333466, pp. 5.

Canadian Patent Office action dated Apr. 22, 2013 from corresponding Canadian Patent Application No. 2,746,224, pp. 3.

English Translation of Russian Patent Office action dated Apr. 26, 2013 from corresponding Russian Patent Application No. 2011127986/12(041528), pp. 3.

(56) References Cited

OTHER PUBLICATIONS

First Office Action dated Jan. 31, 2013 for corresponding Chinese patent application No. 200980138020.2 with English translation, pp. 17.

First Office Action dated Dec. 17, 2012 for corresponding Chinese patent application No. 200980137873.4 with English translation, pp. 18.

Canadian Patent Office action dated Jun. 10, 2013 from corresponding Canadian Patent Application No. 2,746,226 pp. 3.

Second Office Action dated Jul. 9, 2013 for corresponding Chinese patent application No. 200980137971.8 with English translation, pp. 21.

* cited by examiner

Product Mode

| | | | | | |
|---|---|---|---|---|---|
| Display/Function | Idle -<br>1. Computer displays "Select Up to 3 Flavors"<br>2. Computer displays up to 7 flavors (configurable) selections located in line with selection soft key and a "Water Only" and "ICE Only" selection located above the right most bottom soft keys respectively. | | | | |
| Button | | Press 1-3 flavors OR Ice Only soft keys not cannot select both Ice Only and flavors | Press X to go to system setup | Press check without flavor selections | Pression more than 3 flavors |
| Display/Function | | Display highlights the flavors selected | Display un-highlight selections | Display does not change (stay in Idle) | Display reverse videos the first 3 and does not change unless the same item is selected in which case will toggle to un-select. |
| Botton | Press X to clear selections | Press check to select | | | |
| Dixplay/Function | — | 1. Computer displays "Additives and Cup Size"<br>2. Computer displays "Flavor: sel1, and sel3" below where sel1 - sel3 are the flavors previously selected.<br>3. Computer displays three additives available for selection below the top soft keys including Yogurt on the right top key. Note Computer displays additives crossed out if currently unavailable.<br>4. Computer displays four cup size selections "Small" above the bottom left key, "Medium" above the center bottom key, "Large" and "XLarge" above the bottom right most keys respectively. | —<br>— | —<br>— | —<br>— |

Fig. 26

| | | | Product Mode | | | | | |
|---|---|---|---|---|---|---|---|---|
| | | | | | Check is disabled | — | — | — |
| Button | — | Press X to go to previous Display | 1. Place cup under dispenser<br>2. If additive desired 1st select up to three additives<br>3. Press soft key under Small, Medium, Large, or XLarge - this starts the dispensing! | | — | — | — | — |
| Display/Function | — | — | Computer starts dispensing product and Computer displays "Dispensing" with display of cup size, flavors, and additives selected for duration of dispense cycle. | | | — | — | — |
| Botton | — | — | X goes back to Idle and stop dispensing | | — | — | — | — |
| Dixplay/Function | — | — | 1. Computer displays "Select Mixer" and "left" under the left most top soft key and "Right" under the right most top soft key for a two dispenser unit.<br>2. Computer will display "LEFTL" and "RIGHTL" and "RIGHTR" under the two right most soft keys if this system is configured with four dispenser modules.<br>3. If any of the mixers are busy or not functional the computer will display the appropriate left or right text crossed out. | | — | — | — | — |
| Botton | — | — | Press X to go back to Idle, Check is disabled | 1.Press Soft key above available mixer (not crossed out), then computer goes back to idle display.<br>2. Open blender door.<br>3. Place cup and close door<br>4. Computer starts blending with door closure.<br>5. Blending completes (no beep?) then user removes cup and door should close to allow cleaning cycle. | — | — | — | — |

Fig. 27

| System Setup Mode | | | | | | | | | |
|---|---|---|---|---|---|---|---|---|---|
| Botton | From Idle Press X | | | | | | | | |
| Display/Function | Computer displays "System Setup" with "DISP. Setup", "LOAD Fluids", and "Service" displayed under the the top left, center and right soft keys. | | | | | | | | |
| Botton | Press appropriate soft key (DISP Setup, LOAD FLUIDS, or Service) Note other soft keys are disabled | | | | | | | Press X to go back to Idle Mode | Check disabled ? |
| Display/Function | If DISP Setup was selected then the Computer displays "Brightness" on the left and "Contrast" on the right with + and - symbols on each side above and below the associated soft keys. | | If LOAD Fliuds was selected then the Computer displays "Load Fluids" with "Slot 1", "Slot 2", "Slot 3", "Slot 4", and "Slot 5" across the top of the display respectively and "Slot 6" and "Slot 7" across the bottom left of the display respectively. | | If Service was selected then the Computer displays "Status", "Calibrate", "Maint". | | | — | — |
| Botton | Press X or Check to go back to Setup screen | Press appropriate soft keys to modify brightness and Contrast | Press one of the slot slections | Press X or Check to go back to Setup screen | If Status pressed | If Calibrate is pressed | If Maint. Pressed | — | — |
| Display/Function | — | Press X or Check to go back to service screen? | 1. Computer displays "Assign Fluid Slot X" on the left side of the display where x is the slot number selected previously. 2. Computer displays list of up to 255? Fluid selections with current fluid highlighted with up down arrows under the top and bottom right most soft keys respectively. | — | Computer displays? 1. Temp sensor Values. 2. Error log. 3. # of cycles of each product. 4. | Fluid calibration needed? | 1. Cleaning? 2. Dispensing cleaning fluid? 3. Cycle through modes for service testing? | — | — |

Fig. 28a

| System Setup Mode | | | | | | | | | | |
|---|---|---|---|---|---|---|---|---|---|---|
| Botton | — | — | Scroll through product using soft keys and select highlighted fluid by pressing check, Soft keys disabled? Goes back to Load Fluids screen? Primes pump? | Press X to go back to Load Fluids screen | — | — | — | — | — | — |

| Language Botton | |
|---|---|
| Botton | Press language key at any time |
| Display/Function | Current display changes to a new language each time the button is pressed. When starting English the display changes to the languages and order below:<br>1. Spanish, 2. French, 4. Canadian, 5. German, 6. Swedish, 7. Portuguese, 8. Italian, 9. Chinese, 10. Japanese, 11. back to English |

Fig. 28b

INTEGRATED MIXING AND CLEANING BEVERAGE ASSEMBLY AND METHOD THEREOF

CROSS-REFERENCED APPLICATION

This application claims priority to U.S. Provisional Application No. 61/120,772, filed on Dec. 8, 2008, which is incorporated herein by reference in its entirety.

BACKGROUND OF THE INVENTION

1. Field of the Invention

The present disclosure relates generally to an integrated method and system for blending and/or mixing beverages, and thereafter automatically cleaning the beverage assembly. More particularly, it relates to a blender module which is capable of blending and/or mixing flavor/ingredients and ice to form a pre-selected beverage (e.g., a smoothie), as well as cleaning the blender shaft, blade and mixing compartment post-mixing, thereby avoiding flavor contamination and satisfying health and sanitary regulations.

2. Description of Related Art

Multiple steps are involved in creating a beverage or drink, for example, a smoothie drink, from beginning to end, and potential issues can occur at all stages. Smoothie making requires the use of blender pots to create the drink, meaning that the operator is required to purchase, maintain, and then store small wares (blender pots). Limitations of current technology also require the labor intensive transportation of ice to the smoothie machine from a separate icemaking machine in order to maintain a level of usable ice in the smoothie machine. This ice transfer is an issue for many reasons. First, labor is required to transport the ice typically from a back storage room to the point of sale (POS) counter area of a restaurant, where the smoothie machines are typically located. This ice transfer can create a safety hazard for employees who could slip and fall on wet floors or injure themselves by improperly carrying a heavy bucket. It can also increase the likelihood of ice contamination through mishandling.

Once the ice is stocked, the employee must manually add an estimated amount to the blender pot. Since the amount of ice is not measured, but rather “guesstimated” by each employee, this ingredient is not precise and, therefore, makes it difficult to create the same franchised drink time after time.

After the ice is manually added, the juice and any additional fruit or flavor “mix-in” is added by the operator as well. Finally, a size of cup is chosen, and the drink is poured. This last step presents the largest chance for waste. Since the employee must portion the ingredients by hand, any overspill of the drink is left in the blender pot. At each step during this manual process, portion control is compromised, and money is potentially wasted on excess ingredients.

Once the order is complete and the customer has his or her drink, there is one last step to finalize the process—the method of manually cleaning the blender pot after each use to prevent the transfer of flavors and germs. Often, to save time, the blender pots are rinsed in a sink, which can compromise sanitation. While this might seem insignificant, flavor contamination can be a serious threat if customers have food allergies. Another drawback to the washing process is that it involves a substantial amount of time and labor on the part of the operator.

Each step in this process to create a smoothie takes time, typically four to five minutes, and that time could be better spent serving customers or taking more food and beverage orders, directly contributing to the bottom line.

Although premium beverages such as smoothies are growing in popularity, most quick-service restaurants (QSRs) are unable to offer customers these options due to the time limitations of the quick-serve world. Those QSR owners that do opt to serve smoothies are confronted with a common set of challenges—mainly how to sell the same franchised drink time after time with existing labor and equipment limitations.

Accordingly, the present inventors have developed a unique integrated blender module that is capable of blending and/mixing beverage flavors/ingredients with ice, and thereafter automatically self cleans itself for immediate reuse without subsequent flavor contamination.

SUMMARY

An integrated beverage blending and cleaning system comprising: at least one blender module which blends and/or mixes ice and at least one other ingredient within a beverage container, thereby producing the beverage; and a cleaning assembly disposed within the blender module, wherein, upon completion of a blending or mixing sequence and removal of the beverage container from the blender module, a cleaning mode is automatically initiated.

The blender module comprises: a housing; a door which provides access to the interior of the housing; a spindle and blade used to blend and/or mix the ice and the at least one other ingredient, and/or the at least one mixin to form the beverage; a container seal disposed about the spindle which is capable of sealing the beverage container during blending and/or mixing, as well as preventing the beverage container from rotating thereabout; and a container holder.

The cleaning assembly comprises a water source and/or at least one cleaning and/or sanitizing solution source, wherein the water source and/or the cleaning and/or sanitizing solution source are connected to at least one orifice disposed within the housing for cleaning and/or sanitizing at least the interior of the housing, the spindle, the blade and the container seal after use.

The cleaning mode is activated subsequent to completion of the last blending and/or mixing sequence and the removal of the beverage container from the interior of the housing and returning of the door to the closed position.

The blending module includes a variable speed motor to rotate the spindle and the blade in a radial direction. Alternatively, the blending module further comprises a variable speed motor to move the spindle and the blade.

The system door is sealingly disposed about the housing, thereby substantially preventing water and/or cleaning and/or sanitizing solution from passing through the door during the cleaning mode.

The container holder comprises at least one arm disposed about the beverage container and a plurality of orifices disposed thereon, wherein water and/or cleaning and/or sanitizer solution provided from a water and/or cleaning and/or sanitizer solution sources is/are dispensed via the orifices into the housing. The dispensing of water and/or cleaning and/or sanitizing solutions is/are dispensed under pressure.

The cleaning assembly further comprises a vertically disposed conduit in fluid communication with the container holder, whereby water and/or cleaning and/or sanitizing solution from the water and/or cleaning and/or sanitizing solution sources is/are dispensed at the top portion of housing via the distal end of the conduit disposed opposite the container holder. The water source comprises: a water storage container, at least one valve and at least one water conduit connecting the water storage container to the orifices under pressure. The cleaning and/or sanitizing solution sources further comprises: a cleaning solution storage container, one or more valves and at least one cleaning and/or sanitizing solution conduit connecting the cleaning and/or sanitizing solution source to the one or more orifices under pressure, wherein the water conduit and the cleaning and/or sanitizing solution conduit are connected to an inlet of the one or more orifices via a fitting disposed downstream of the water source and the cleaning and/or sanitizing solution source.

The spindle and the blade are reversible so as to both blend the ice and the at least one ingredient when the spindle and blade are rotated in one direction and mixing into the beverage the at least one mixin when the spindle and blade are rotated in a second direction. Preferably, the blade is an emulsifying blade.

The container seal comprises a lid portion and at least one alignment member, and wherein the container seal moves in a vertical direction together with the spindle and the blade such that the lid sealingly engages a top portion of the beverage container, thereby preventing the ice and the other ingredients from splashing outside of the beverage container and preventing container rotation or other unwanted movement during the blending and/or mixing process.

The system further comprises a linear slide and stepper motor which move the spindle and the blade in a vertical direction.

The system further comprises a controller which counts a number of steps that the motor travels allowing precise location of the blade within the beverage container, thereby allowing the ice and the at least one other ingredient to blend throughout the beverage container providing a uniform beverage each time a beverage is blended and/or mixed in the blender module.

The system further comprises a safety switch in proximity with the door which disengages the blade when the door is opened. Alternatively, the system further comprises a device in proximity with the door which will prevent the door from being opened when the spindle and/or the blade is engaged. The system further comprises a sensor which indicates the presence of the beverage container in the blending assembly.

A method for producing at least one beverage in a blender module and automatically cleaning the blender module subsequent to producing the beverage in the blender module, the method comprising: blending and/or mixing ice and at least one other ingredient, and/or at least one mixin in a beverage container, thereby producing the beverage; and activating an automatic cleaning mode wherein upon completion of a blending or mixing sequence and subsequent to the removal of the beverage container from the interior of the blender module, wherein the blending assembly is cleaned for subsequent usage.

The cleaning mode is performed by supplying water and/or at least one cleaning solution and/or at least one sanitizing solution via a cleaning assembly associated with the blending module, wherein the cleaning assembly comprises a water source and/or cleaning and/or sanitizing solution source connected to the container holder for cleaning and/or sanitizing at least the interior of the housing, the spindle, the blade and the container seal after use.

The cleaning assembly comprises a water source and/or at least cleaning solution and/or at least one sanitizing solution source connected to at least one orifice disposed within the housing for cleaning and/or sanitizing at least the interior of the housing, the spindle, the blade and the container seal after use.

The cleaning and/or sanitizing mode is activated upon completion of a blending or mixing sequence and subsequent to the removal of the beverage container from the interior of the housing and returning of the door to the closed position.

The method further comprises sealing the door about the housing, thereby substantially preventing water and/or cleaning and/or sanitizing solutions from passing through the door during the cleaning mode.

The container seal comprises a lid portion and at least one alignment member, and wherein the method further comprises moving the container seal in a vertical direction together with the spindle and the blade such that the lid sealingly engages a top portion of the beverage container.

The method further comprising controlling the location of the blade within the beverage container, thereby allowing the ice and the at least one other ingredient to blend throughout the beverage container providing a uniform beverage each time a beverage is blended and/or mixed in the blender module.

The cleaning mode is based upon instructions communicated from a controller. The blender module blends and/or mixes the ice and at least one other ingredient, in the beverage container based upon instructions communicated from a controller.

The cleaning mode comprises: dispensing the water and/or the cleaning and/or sanitizing solution into the housing of the blender module; energizing the spindle and the blade; reciprocally moving the energized spindle and the blade within the housing of the blender module; de-energizing the spindle and the blade; returning the spindle and the blade to its home position; dispensing air into the housing of the blender module to assist in the removal of residual water and/or cleaning and/or sanitizing solution, the dispensed air will also provide a positive pressure on the drain system to assist in the removal of residual beverage, ice, water and/or cleaning and/or sanitizing solutions.

The other ingredient are at least one selected from the group consisting of: syrup, fruit juice, coffee, yogurt, tea, carbonated and non-carbonated beverages, alcoholic beverages, milk and cream. The mixin is at least one selected from the group consisting of: candy, cookies, syrups, nuts, fruits or fruit pieces or purees, whipped cream, wheat grass, and neutriceuticals.

The above-described and other advantages and features of the present disclosure will be appreciated and understood by those skilled in the art from the following detailed description, drawings, and appended claims.

BRIEF DESCRIPTION OF THE DRAWINGS

FIG. 26 is a listing of controller steps for selecting ingredients/flavors, additives and serving cup size according to the present disclosure;

FIG. 27 is a listing of controller steps for dispensing ingredients into a pre-selected serving cup size, selecting which blending/mixer module is to be activated and activating the selected blender according to the present disclosure; and FIGS. 28*a* and *b* are a listing of controller steps and displays for a system setup mode according to the present disclosure.

DETAILED DESCRIPTION OF THE INVENTION

Figure 1:
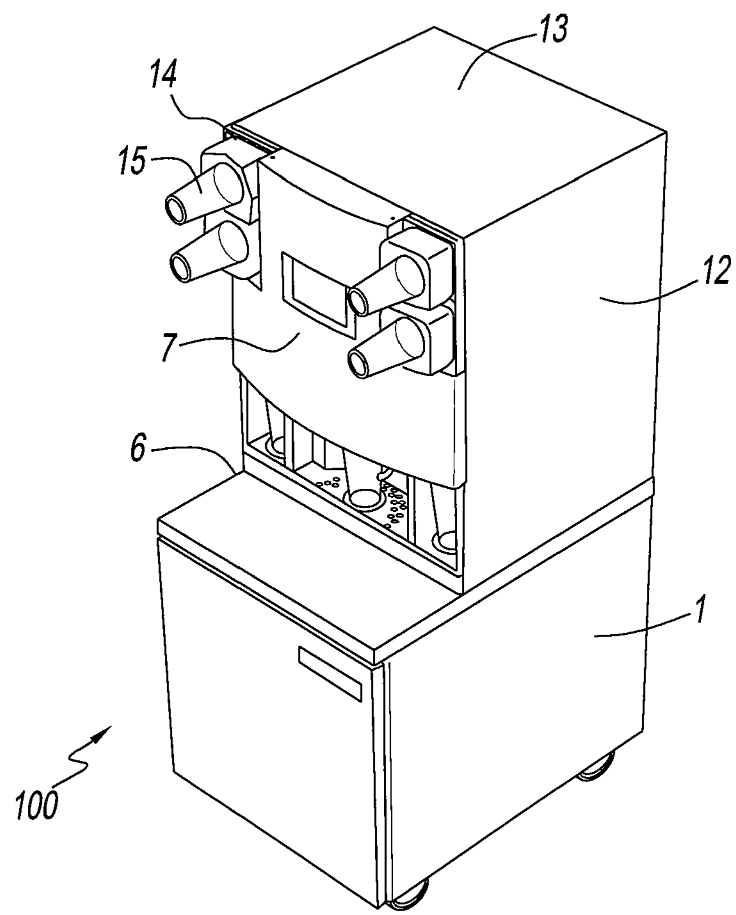
FIG. 1 is a front perspective view of an exemplary embodiment of a system that dispenses and blends/mixes/cleans beverages according to the present disclosure.
Figure 4:
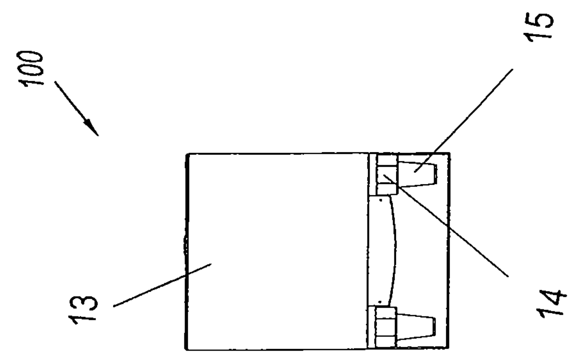
FIG. 4 is a top view of the assembly that dispenses and blends/mixes/cleans beverages of FIG. 1.
Figure 3:
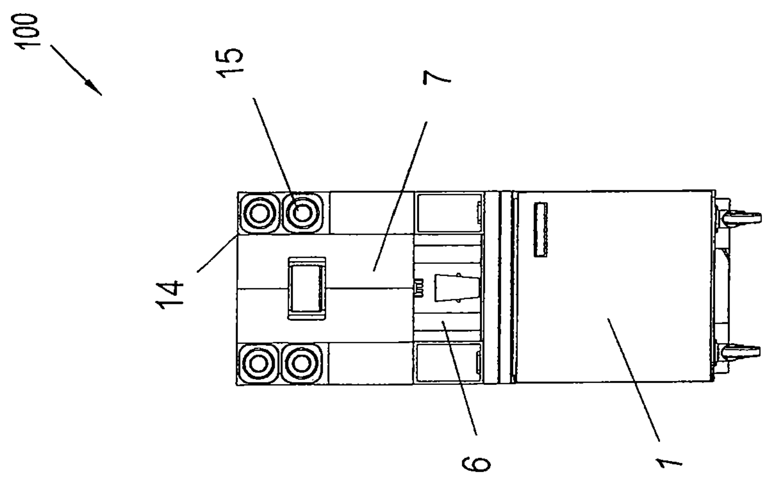
FIG. 3 is a front view of the assembly that dispenses and blends/mixes/cleans beverages of FIG. 1.
Figure 2:
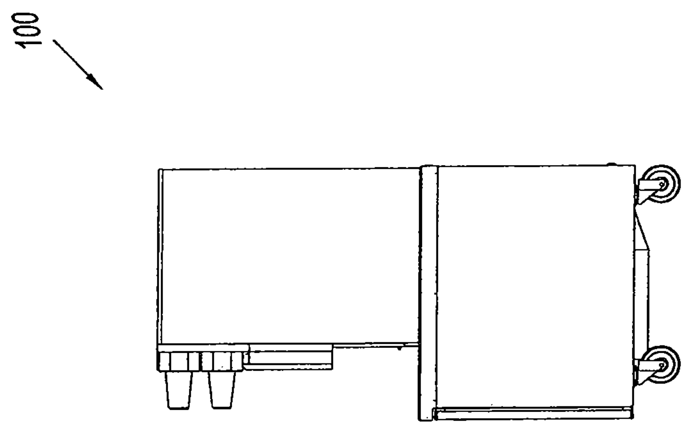
FIG. 2 is a side view of the assembly that dispenses and blend/mixes/cleans beverages of FIG. 1.
Figure 5:
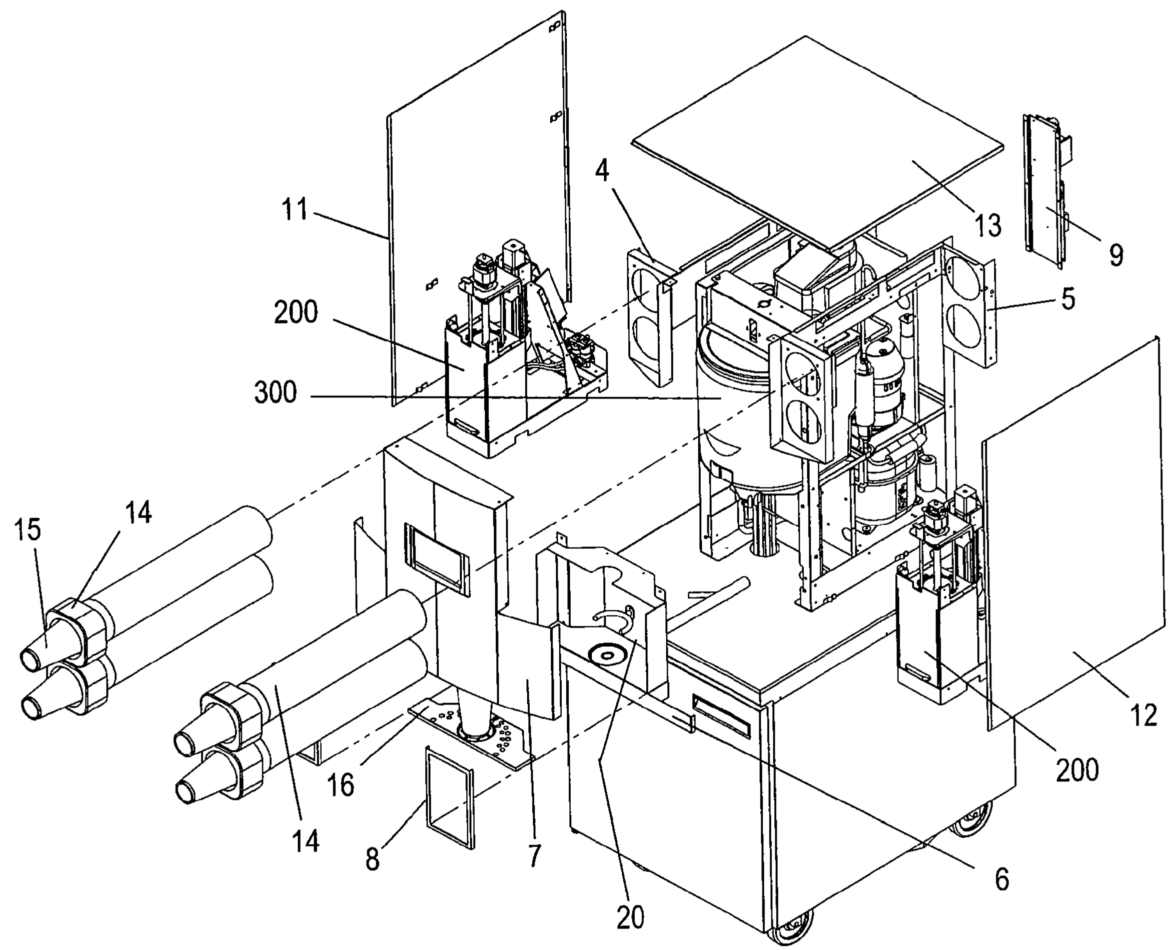
FIG. 5 is an exploded view of the assembly that dispenses and blends/mixes/cleans beverages of FIG. 1.

Referring to the drawings and in particular to FIGS. 1-5, an exemplary embodiment of an assembly that dispenses and mixes beverages ("assembly"), according to the present disclosure is generally referred to by reference numeral 100. Assembly 100 makes ice, dispenses flavors/ingredients and ice into a serving cup 15, and then blends or mixes to form a beverage. One such beverage, for example, is a smoothie that preferably includes a flavor ingredient and ice mixed together. Assembly 100 has an onboard ice maker, ice storage and portion control module 300, a flavor/ingredient dispensing module 1100, and a blender/mixer/cleaning module 303. Assembly 100 shows ice maker, ice storage and portion control module 300, flavor/ingredient dispensing module 1100, and blender/mixer/cleaning module 303 as one integrated assembly. It is contemplated by the present disclosure that one or more of ice maker, ice storage and portion control module 300, flavor/ingredient dispensing module 1100, and blender/mixer/cleaning module 303 may be separate from assembly 100, however, it is preferable that they are all integrated into a single assembly 100. That is, vertical placement of ice maker, ice storage and portion control module 300, flavor/ingredient dispensing module 1100, and blender/mixer/cleaning module 303 reduces a size of assembly 100 and its associated flooring footprint in comparison to three separate and distinct machines.

Assembly 100 has a housing that includes a lower wall 6, an upper wall 7, side walls 11 and 12, and a top wall 13. Lower wall 6 has a container holder portion 20. The housing connects cup supports 4 and 5 that secure cup holders 14 to assembly 100. Cup holders 14 removably hold cups 15 therein. Cup 15 may be disposable or reusable single serving cups. If cup 15 is disposable, such as, for example, paper or plastic cups, the beverage dispensed and mixed within cup 15 may be served directly to a customer eliminating the step of pouring the beverage into a serving cup and eliminating labor needed to wash an additional container. Cup 15 may be any size, such as, for example, about 10 ounces to about 32 ounces.

Figure 6:
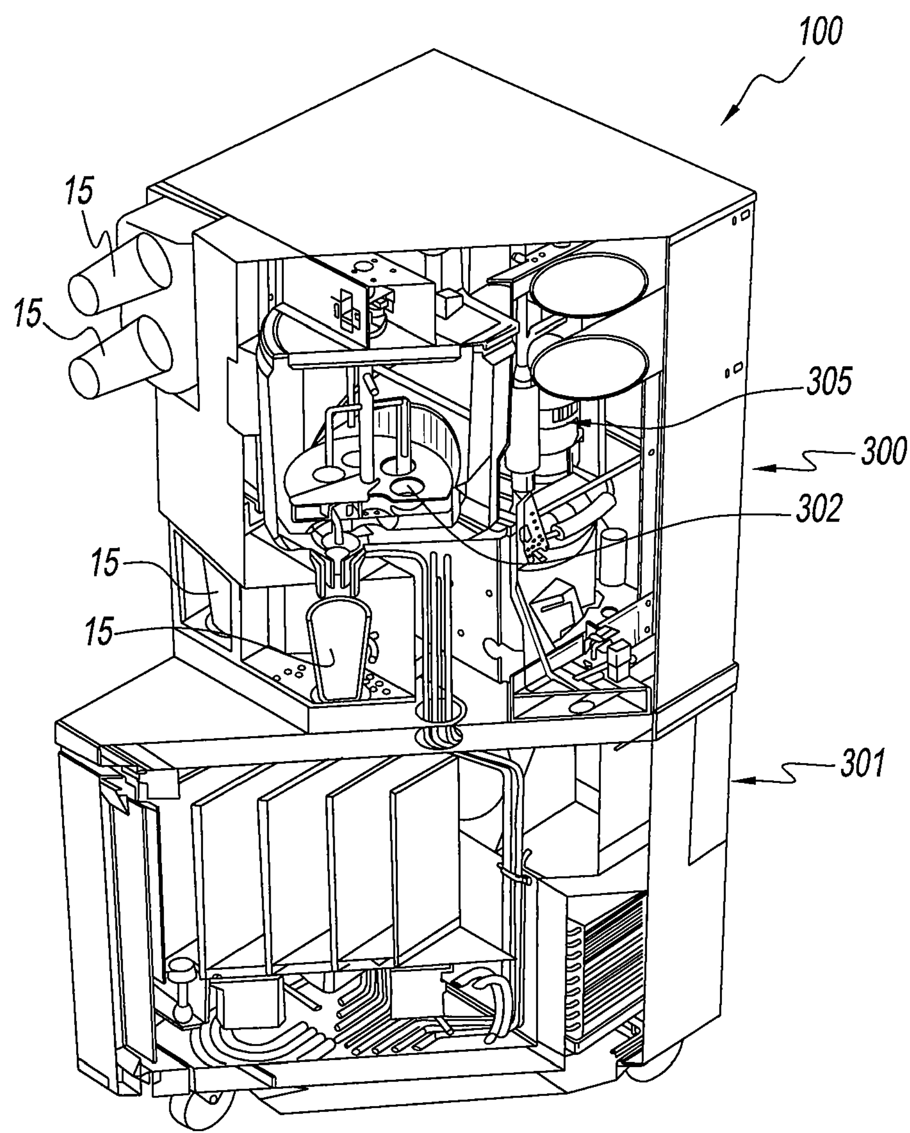
FIG. 6 is a top front left-side perspective view of the system of the present disclosure wherein the front left-side portion has been cut away to depict each of the ice making and portioning module, and dispensing module.
Figure 7:
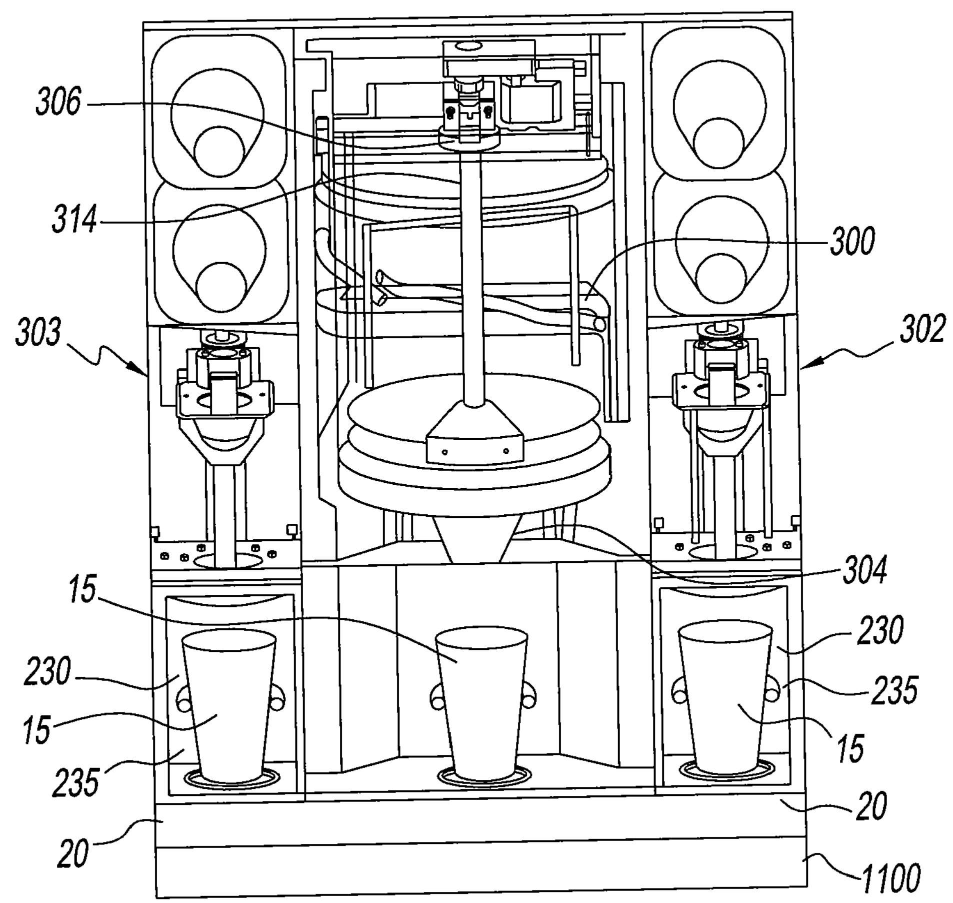
FIG. 7 is a partial front cross-sectional view of the integrated ice maker bin and portion control assembly, dispensing nozzle and pair of oppositely disposed blender/mixer/cleaning assembly according to the present disclosure.

FIGS. 6 and 7 provide a overview of the integrated assembly 100 according to the present disclosure, wherein assembly 100 comprises: flavor/ingredient dispensing module 301, ice maker, ice storage and portion control module 300 and a pair of blender/mixer/cleaning modules 303 disposed on opposite sides of dispensing nozzle 304. Ice maker, ice storage and portion control module 300 includes an ice maker 305. Ice maker 305 may be any ice maker, and, preferably an ice maker that forms flakes of ice. For example, ice maker 305 may include an ice making head of cylindrical configuration in which a water container that is filled with water from a water source has at least one refrigerated wall forming a freezing chamber cooled by a flow of refrigerant gas, and a motor driven scraper which continuously breaks up ice forming on the refrigerated surface into ice flakes. The refrigerant gas may be cooled by a refrigeration cycle, such as, for example, a vapor compression cycle that includes a compressor, condenser, expansion valve, and evaporator. One or more of the compressor, condenser, expansion valve, and evaporator may be integral with assembly 100 or remote from the rest of assembly 100. For example, compressors may create undesirable noise and may be remotely located from the rest of assembly 100. Ice maker 305 may include an axially-extending auger or auger assembly that is rotatably disposed within the freezing chamber and generally includes a central body portion with one or more generally spirally-extending flight portions thereon disposed in the space between the central body portion and the refrigerated wall in order to rotatably scrape ice particles from the cylindrical freezing chamber. A drive means assembly rotatably drives the auger such that when make-up water is introduced into the freezing chamber through a suitable water inlet and frozen therein, the rotating auger forcibly urges quantities of ice particles through the freezing chamber to be discharged through an ice outlet end.

Nugget ice may be made from the flakes by passing the flakes of ice through an extruder head where a nugget shape is formed. Nugget ice is different from cube style ice in that the nugget is not homogenous but is multiple flakes of ice compressed into a nugget. Nugget ice is softer ice (easier to chew) that requires less power to mix into a beverage. Ice maker, ice storage and portion control module 300 is shown as mounted as an integral part of assembly 100 but can be located remotely and ice mechanically transported to assembly 100. The nuggets of ice are pushed through the extruder head and this force can be used to transport the ice to assembly 100, which may allow for larger ice output. Ice maker 305 reduces an overall sound level and allows for operation near a front counter or drive-through window without impacting communications. The use of nugget ice also allows the operate to use single serving cup for dispensing, blending and serving the consumer because the stress of blending cubed ice is reduced.

The blend-in-cup smoothie system of the present disclosure includes a variable speed vertical blender/mixer/cleaning modules 303 that permits the operate and customers to develop unique drinks. The blender/mixer/cleaning modules 303 is comprises of the following components: blender spindle driven by a variable speed motor, linear slide used to move the blender spindle in and out of the drink cup. The blender spindle is attached to the linear slide. The linear slide utilizes a drive motor with variable speeds to control the speed at which the blender spindle is inserted or removed from the drink cup. Additionally, the linear slide can be stopped and started at different levels in the cup. This is important from both a drink consistency and an equipment reliability. It is possible to stall the spindle if the spindle is lowered to quickly or to far into the cup prior to the start of the blending operation. Prior to blending the ice size is much larger than the ice in a fully blended drink.

Figure 8:
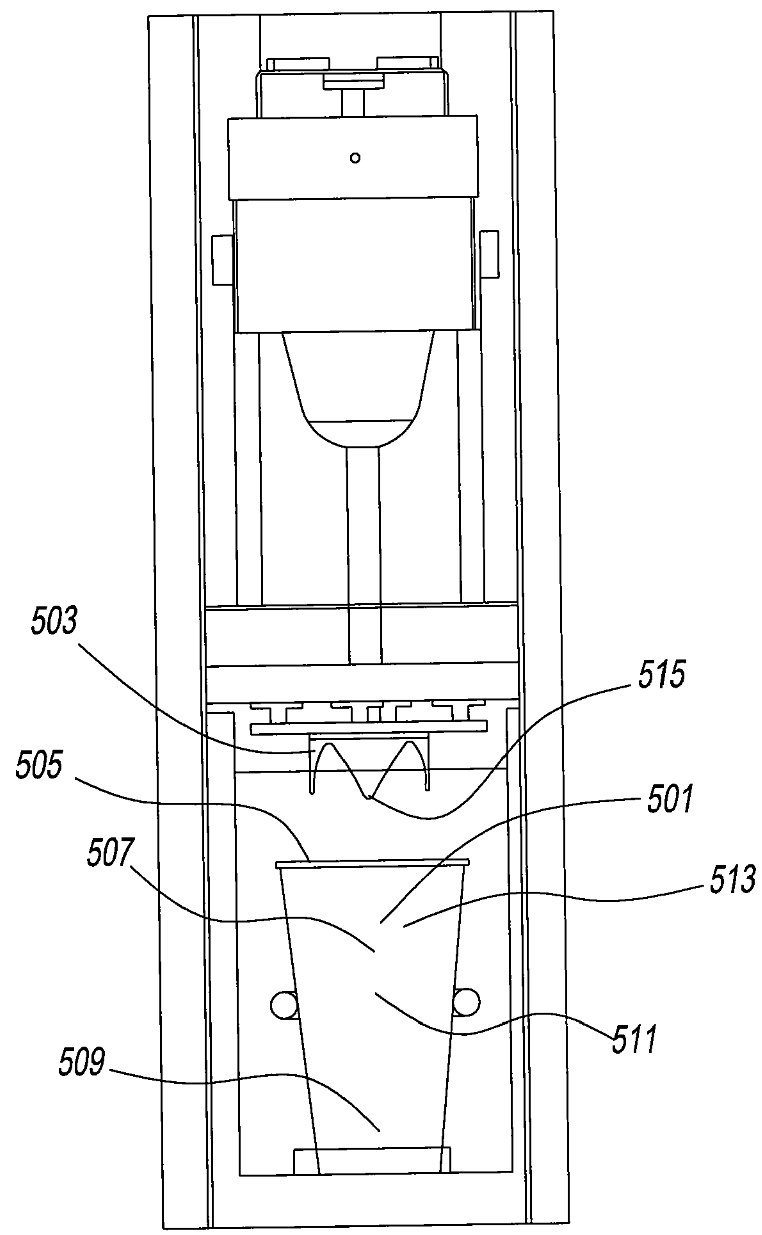
FIG. 8 is a front planar view of a blending/mixing/cleaning assembly according to the present disclosure, wherein representative position points for the spindle during processing are exemplified according to one embodiment.

The electronic controller is used to control the speed, depth and dwell time of the blender spindle. FIG. 8 demonstrates the vertical movement of the spindle within the cup during blending and mixing, wherein the mixer is turned on during the downward movement at point 501 at the spindle 503 enters cup or vessel 505 and rapidly moves to a first downward position 507 at 1 ft/sec. Thereafter, spindle 503 continues its downward descent into cup 505 until it reaches a second downward position 509 at a speed of about 2 ft/sec. near the bottom of cup 505. After a predetermined period of time when spindle 503 is at second downward position 509, it then begins its upward movement to a first upward position 511 at a speed of 2 ft/sec and then to a second upward position 513 where the spindle 503 is turned to the off position. Finally, spindle 503 is removed from the cup and returned to a premixing position 515.

During recipe creation the customer is able to experiment with different variables to provide the drink flavor and ice profile desired. The controller is then used to signal the spindle to move down at a specified speed to the initial contact point in the cup "kiss off point" determined by the height of the cup. Upon reaching the "kiss of point," the controller energizes the motor for the blender spindle. The controller then instructs the linear slide to move down to the bottom of the cup at a predefined speed. The controller can then control the amount of time (dwell time) that the spindle remains in its lowest position to fully emulsify the ice and to blend the ingredients together. The controller then instructs the spindle retract to its resting position.

By manipulating the variables the customer can control the size of the particles (ice bites) and the viscosity of the drink. Additionally, the variability of the blender speed provides the customer the ability to mix in ingredient and mixins. A mixin is an ingredient that the customer adds to the drink, but does not want emulsified with the ice and flavor ingredients. To perform both mixing and blending of the drink ingredients it is necessary to either vary the speed of the blender motor or to use a bi-directional (reversible) motor to spin the blender blade. In the primary direction the sharp edges of the blade emulsify the ingredients to create a fully blended drink. Use of a sharp edge of the blade for emulsification maintains the integrity of the ice bits. When mixing the drink, the motor is reversed such that the dull edge of the blade only mixes the ingredient into the drink without altering the size of such ingredients.

The electronic controller utilizes current sensors or other sensors to measure and record the power output to the blender spindle. If the power output required by the blender increases this would indicate that the blender blade or the shaft bearings on the blender are wearing and causing "drag" on the blender motor.

FIGS. 9-21 depict a blender/mixer/cleaning module 303 of assembly 100. It is contemplated by that assembly 100 may include, for example, from one blender/mixer/cleaning module up to six or more blender/mixer/cleaning modules. More than one blender/mixer/cleaning module 303 allows for creation of a second beverage while mixing a first beverage, contributing to higher beverage output by assembly 100.

Figure 13:
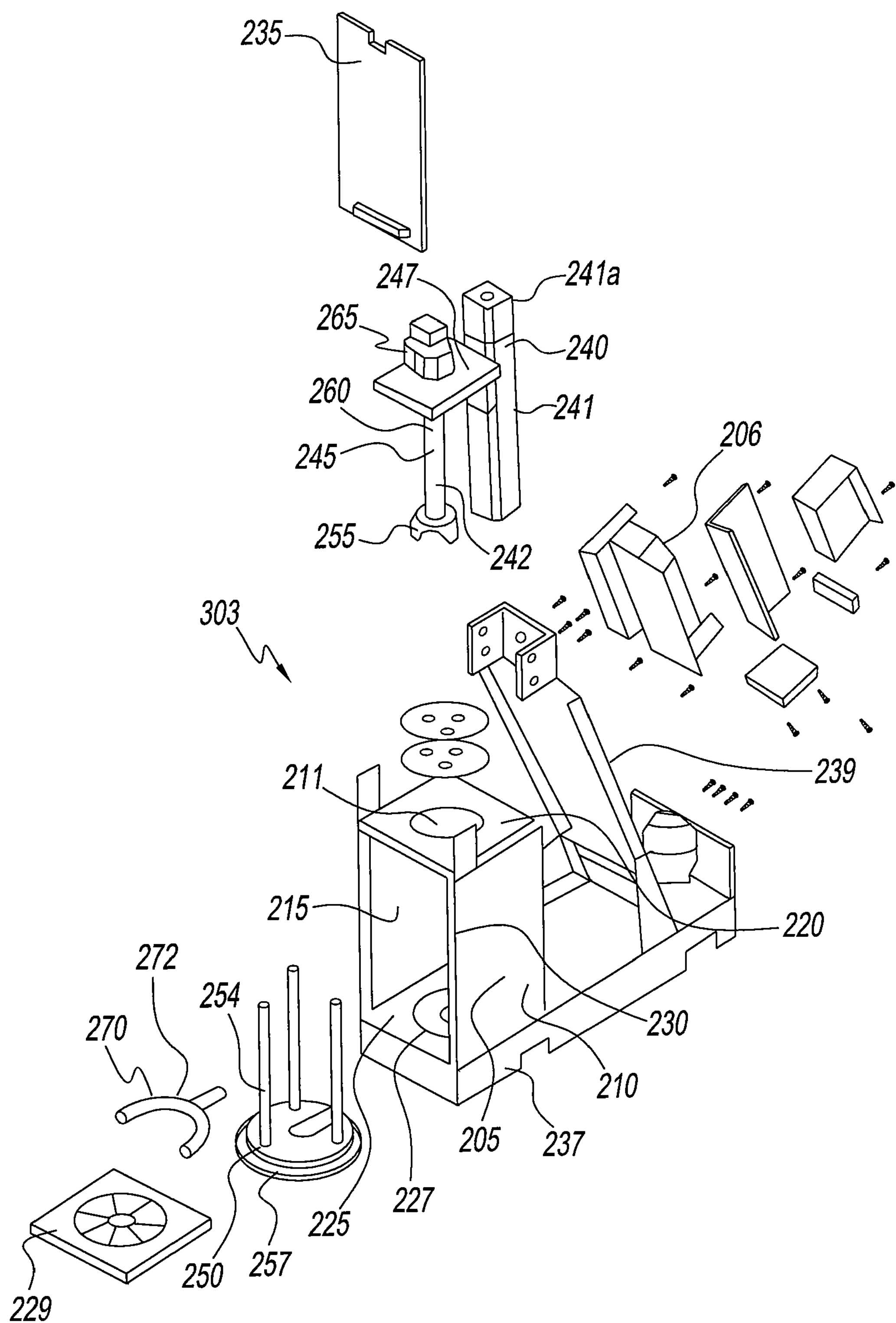
FIG. 13 is an exploded view of the blender/mixer/cleaning assembly of FIG. 9.
Figure 14:
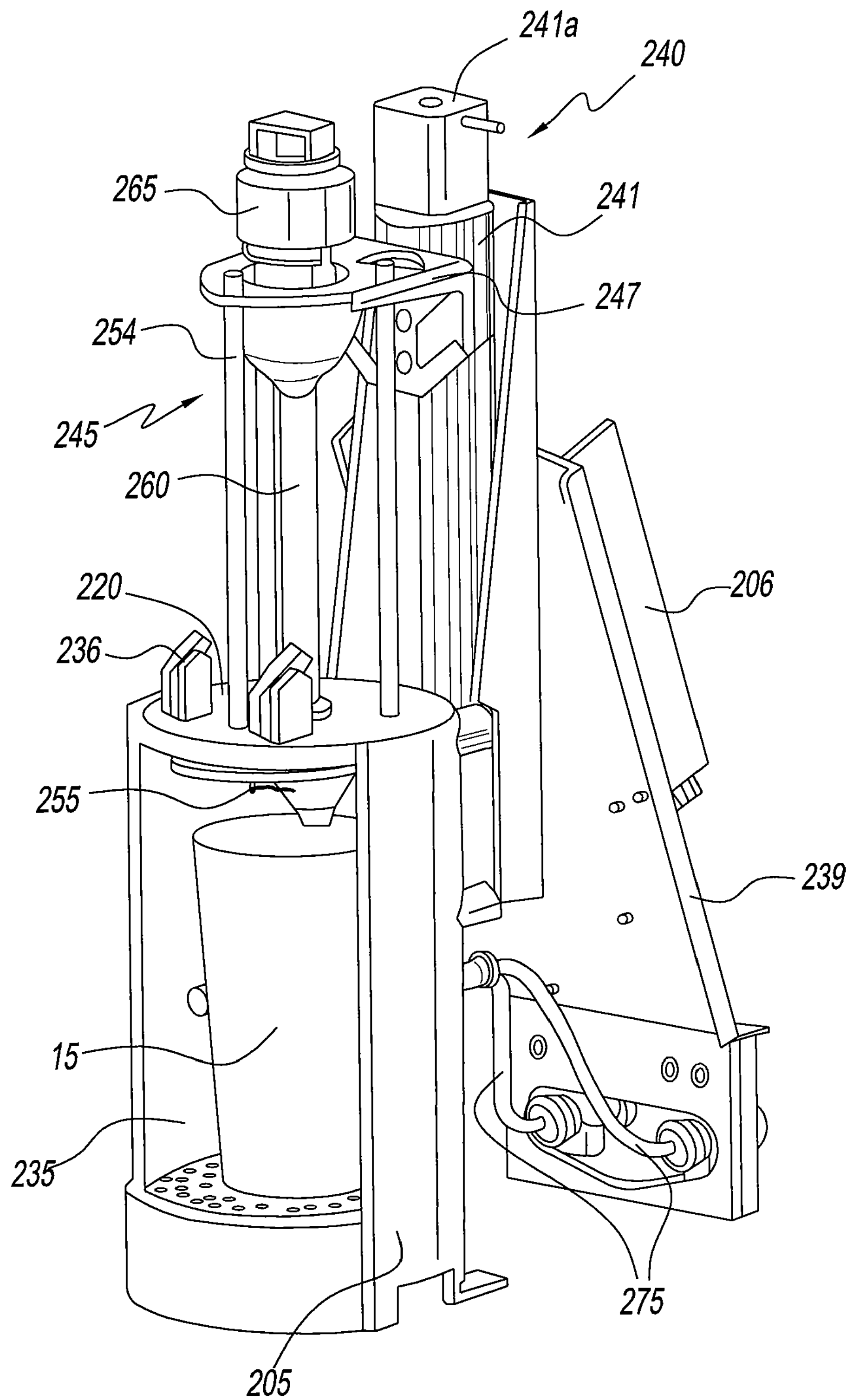
FIG. 14 is a front right side perspective view of the blender/mixer/cleaning assembly according to the present disclosure with a serving cup disposed therein, the blending blade in the retracted position and the door in the closed position.
Figure 15:
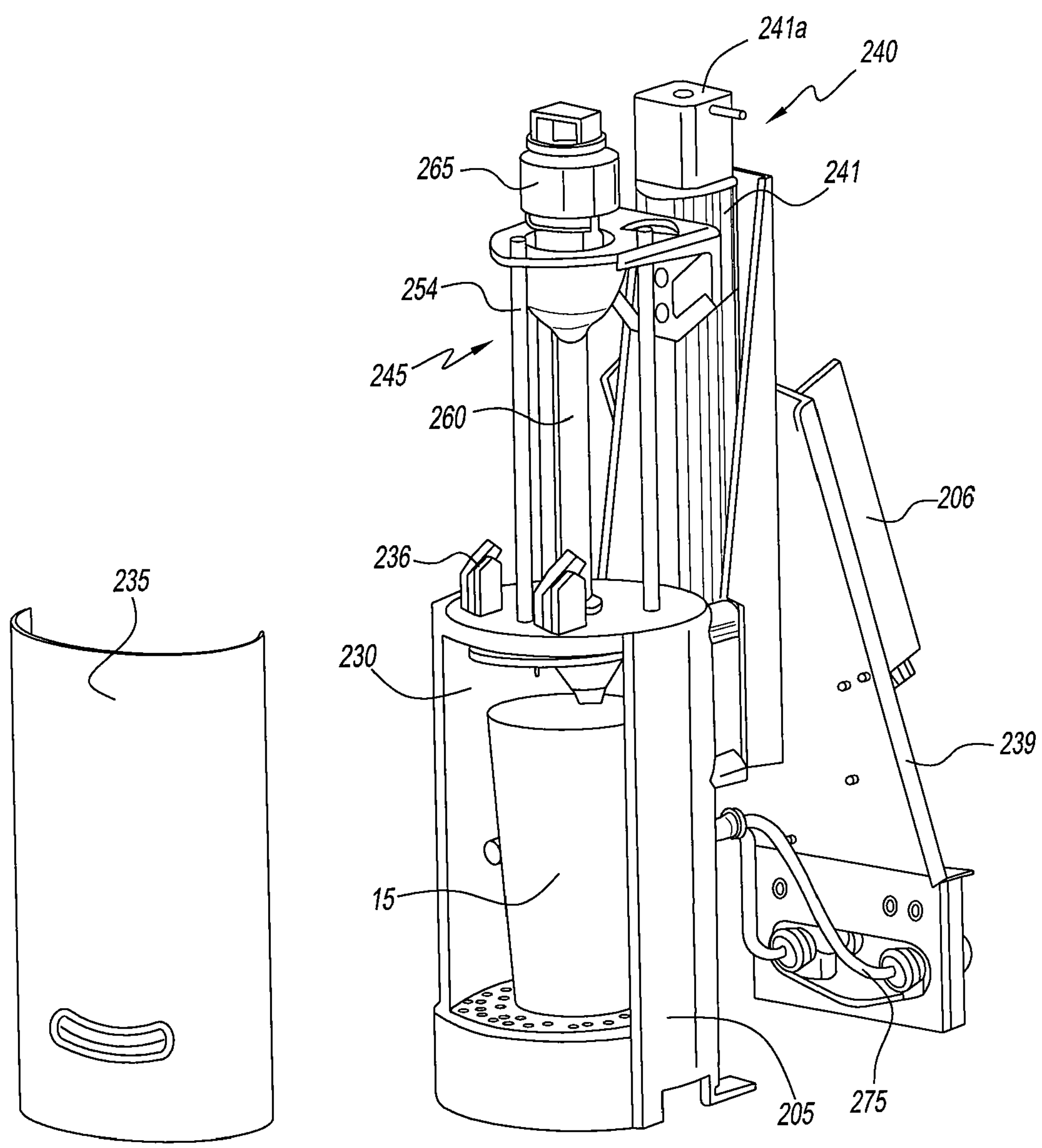
FIG. 15 is front right side perspective view of the blender/mixer/cleaning assembly of FIG. 14, wherein the door has been removed from the assembly.

As shown in FIG. 13, blender/mixer/cleaning module 303 has a blender housing 205. Blender housing 205 has a first side wall 210, a second side wall 215, a back wall 217, a top wall 220, and a bottom wall 225 forming an interior volume 230. Interior volume 230 may be enclosed by a door 235 that moves to a closed position when in blending, mixing or cleaning mode, shown in FIGS. 7 and 14, and an open position uncovering interior volume 230 when blender/mixer/cleaning module 303 is in a load or unload mode. Optionally, door 235 may be a material that transparent or translucent so that interior volume 230 is visible when door 235 is in the closed position. Door 235 is removable for maintenance as shown in FIG. 15. Bottom wall 225 may have a drain aperture 227. Door 235 may optionally be sealed about the interior surface of housing 205 by providing a tubing (not shown) about the interior surface of door 235, which allows air to flow therethrough, thereby creating a venturi suction to capture water and preventing the water from exiting blender/mixer/cleaning module 303. Alternatively, a tube may be disposed on the outside of door 235, wherein the tube includes small orifices. During use, air would flow through this tube and provide a pressurized door seal. In this configuration, door 235 would slide easily up and down when not in a cleaning mode, but be held securely in place during cleaning mode. Drain aperture 227 may be covered by a filter cover 229.

Blender housing 205 is optionally supported on a support structure 237. Support structure 237 has a motor support 239 that extends therefrom. Motor support 239 is connected to a motor 240. Motor 240 may be a stepper motor 241*a* with a linear slide 241 that is connected to motor support 239. Motor 240 is connected to a blender 245. Motor 240 may be connected to blender 245 by a bracket 247 that is moved by motor 240. Motor 240 moves spindle shaft 260 of blender 245 in a reciprocal vertical movement through top wall 220 into or out of interior volume 230.

Figure 20:
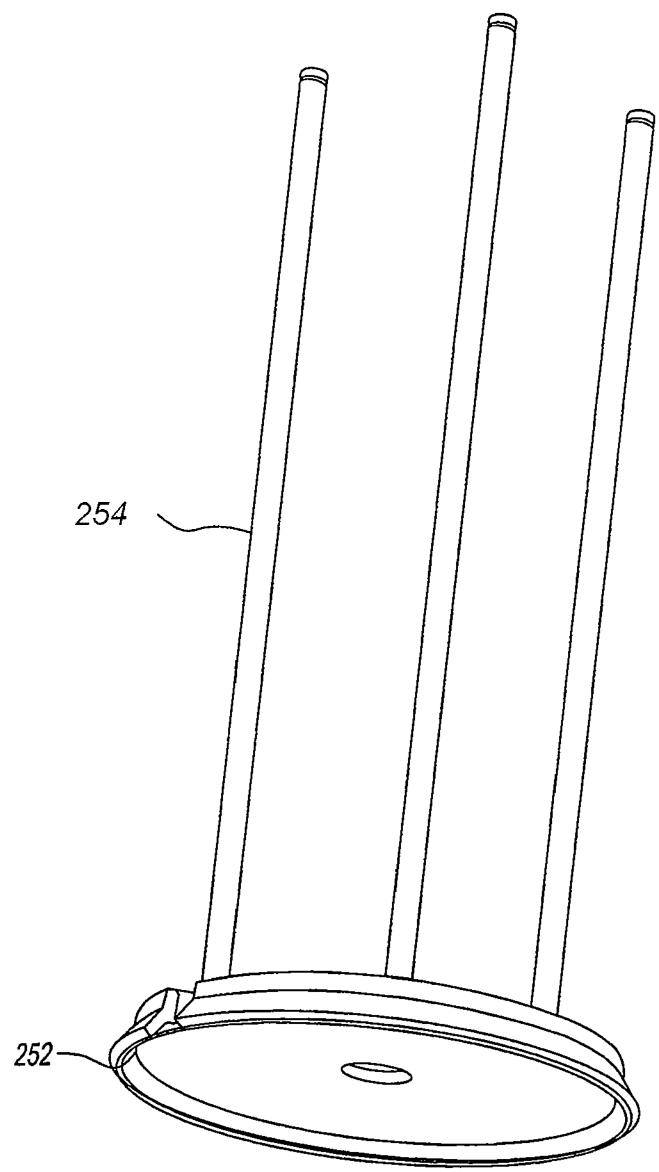
FIG. 20 is a bottom front perspective view of the serving cup lock and seal lid used in the blender/mixer/cleaning assembly of FIG. 14.

Blender 245 may be connected to a lid assembly 250, as shown in FIG. 20. Lid assembly 250 has a lid 252 and a plurality of alignment rods 254. Lid 252 is complementary in shape to a container, for example, a cup 15 having liquid therein placed within interior volume 230. Lid assembly 250 may move with blender 245 into interior volume 230 into contact with cup 15. Lid assembly 250 remains in contact with cup 15, once lid assembly 250 is in contact with cup 15 while blender 245 may move further into interior volume 230 along a length of connection rods 254. Spindle does not engage or spin until lid assembly 250 is in contact with cup 15 to prevent and spray or splatter. When blender 245 is retracted toward top wall 220, blender 245 moves along the length of alignment rods 254 until an end of alignment rods 254 is reached and then lid assembly 250 moves with blender 245.

Blender 245 has a spindle assembly 242 having a blender blade 255 that is wider than a spindle shaft 260. Blender blade 255 has projections that facilitate mixing of liquid within the cup 15. Spindle shaft 260 connects to a blender motor 265 that spins blender blade 255 and spindle shaft 260.

Figure 19:
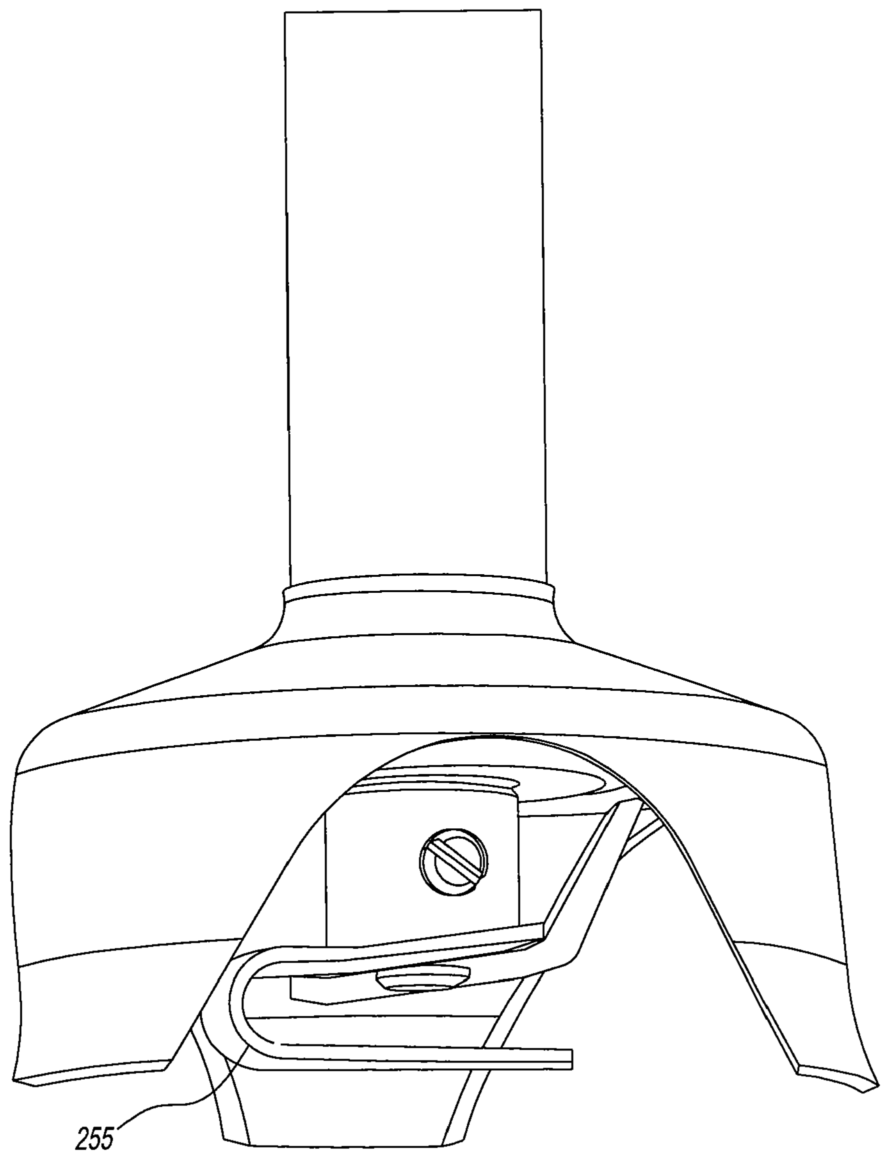
FIG. 19 is a bottom front perspective view of a blender blade according to the present disclosure.

Blender 245 may be attached to linear slide 241 so that linear slide 241 moves blender 245 vertically. A controller provides a mixing profile that insures proper mixing of the beverage. Linear slide 241 is driven by the stepper motor 241*a* that provides precise control of movement of linear slide 241. Controller may move blender blade 255 about 25% into the liquid within cup 15 before blender 245 is energized to spin blender blade 255. By moving blender blade 255 about 25% into the liquid within cup 15 before blender 245 is energized to spin blender blade 255, splatter from blender 245 energizing before entering into the beverage is reduced and/or eliminated. After blender blade 255 is energized a customizable program indexes blender blade 255 down into cup 15. Blender blade 255 may be energized with a customizable program that indexes blender blade 255 down into cup 15 to insure that the nugget ice has a particle size that is reduced to beverage specifications defined by the user. Blender blade 255 dwells at a bottom of cup 215 for a predetermined amount of time. Blender blade 255 is raised and lowered for a predetermined period of time to provide complete blending of components of the beverage. After mixing is complete spindle assembly 242 returns to a home position, as shown in FIGS. 7 and 14. Stepper motor 240*a* and linear slide 240 may have a controller that counts a number of steps that motor travels allowing precise location of blender blade 255 leading to uniform beverages each time a beverage is dispensed and mixed from assembly 100. Preferably, blender blade 255 is an emulsifying blade as shown in FIG. 19.

Door 235 may have a safety switch 236. Microswitches are located on blender housing 205. When door 235 is raised a microswitch 211, as shown in FIG. 13, is switched and blender blade 255 is disengaged from cup 15 retracting to it off position. Additionally, there is a tab 267, as shown in FIG. 18, that is a door interlock on blender 245 that prevents door 235 from being opened when blender blade 255 is lowered.

Figure 18:
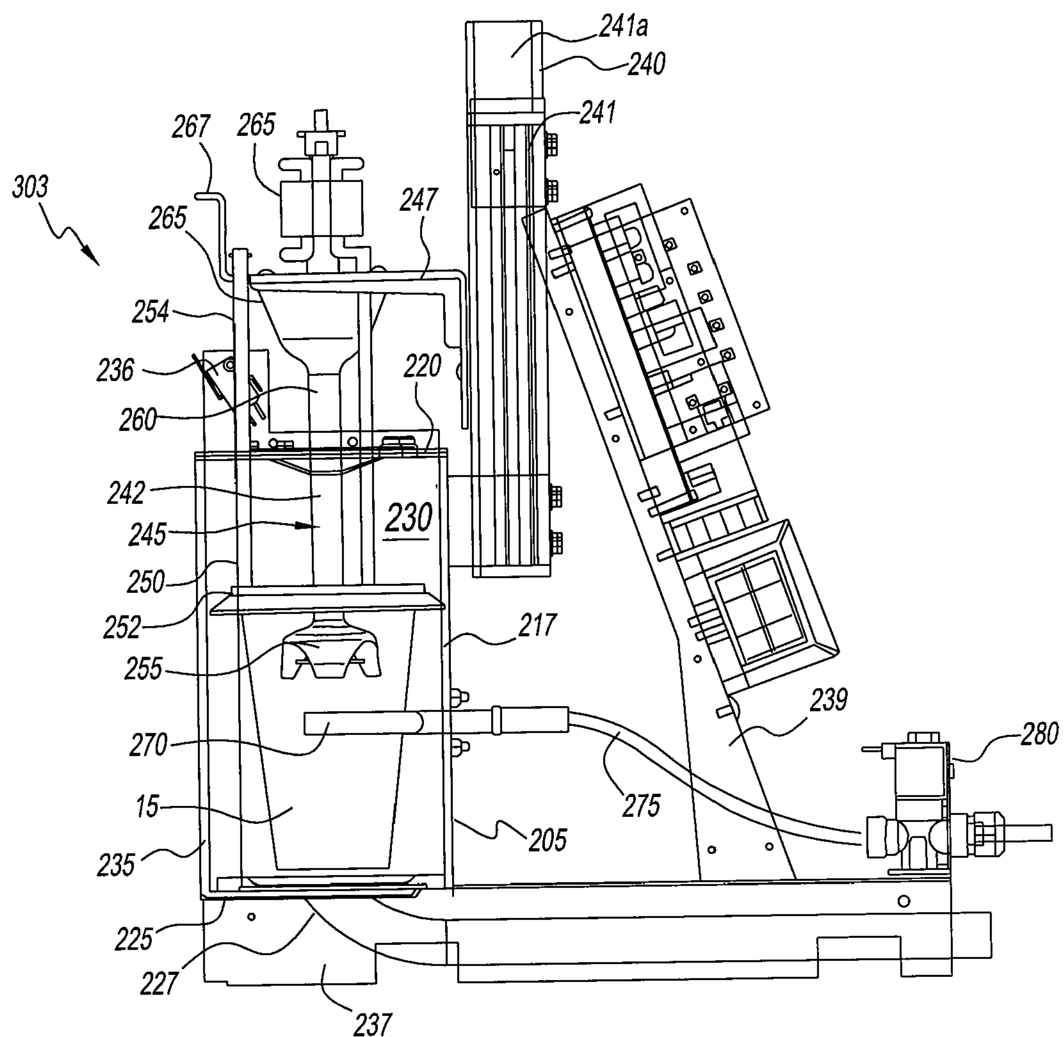
FIG. 18 is a right side view of the entire blender/mixer/cleaning assembly according to FIG. 14 without the cleaner snorkel dispensing member.

Referring to FIG. 18, back wall 217 may have a container or cup holder or guide 270 connected thereto. Holder 270 may hold cup 15 in position during mixing by blender 245. Holder 270 may be shaped complimentary to the shape of cup 15, for example, a U-shape.

Figure 16:
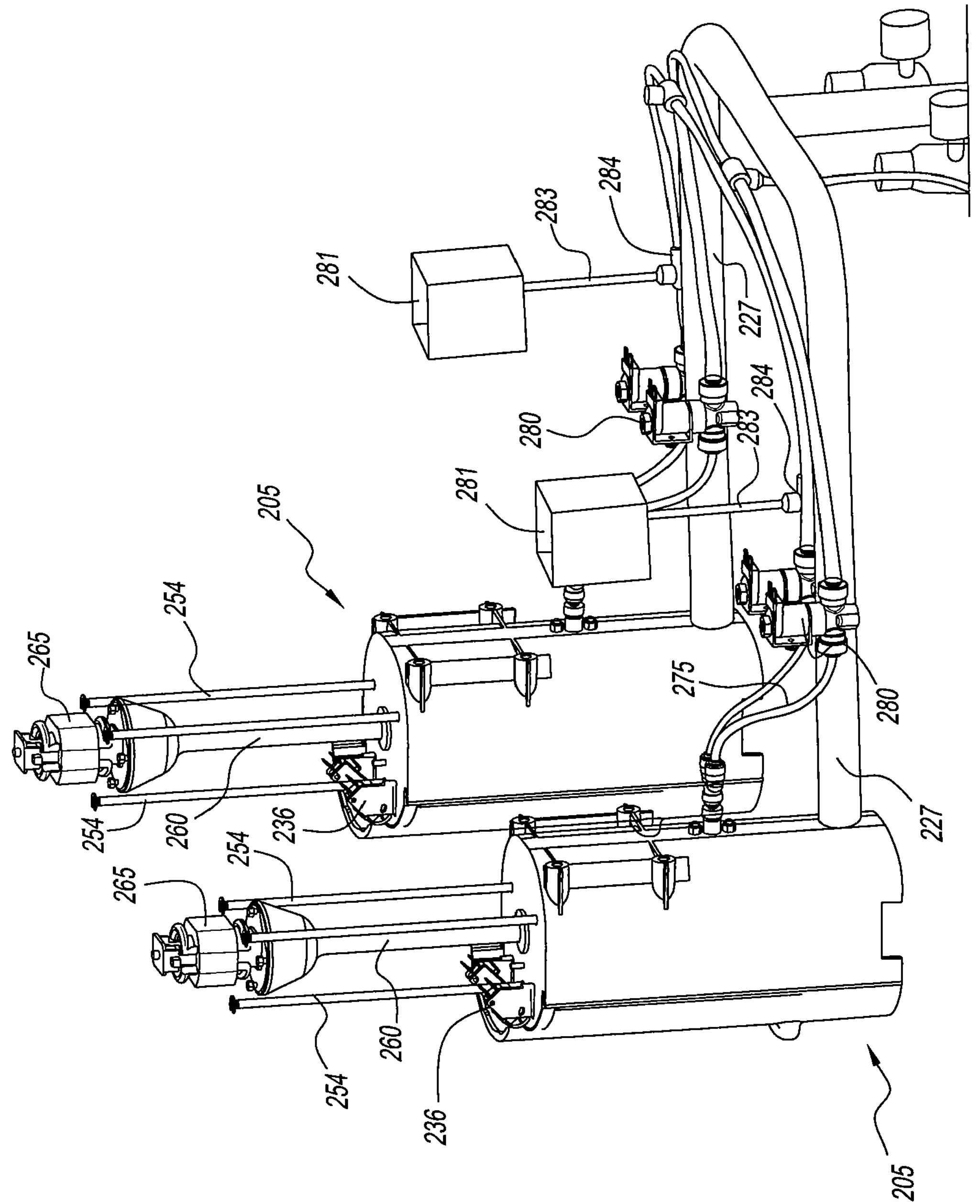
FIG. 16 is a back right side perspective view of a pair of blender/mixer/cleaning assemblies according to another embodiment of the present disclosure with associated cleaner storage receptacles.
Figure 17:
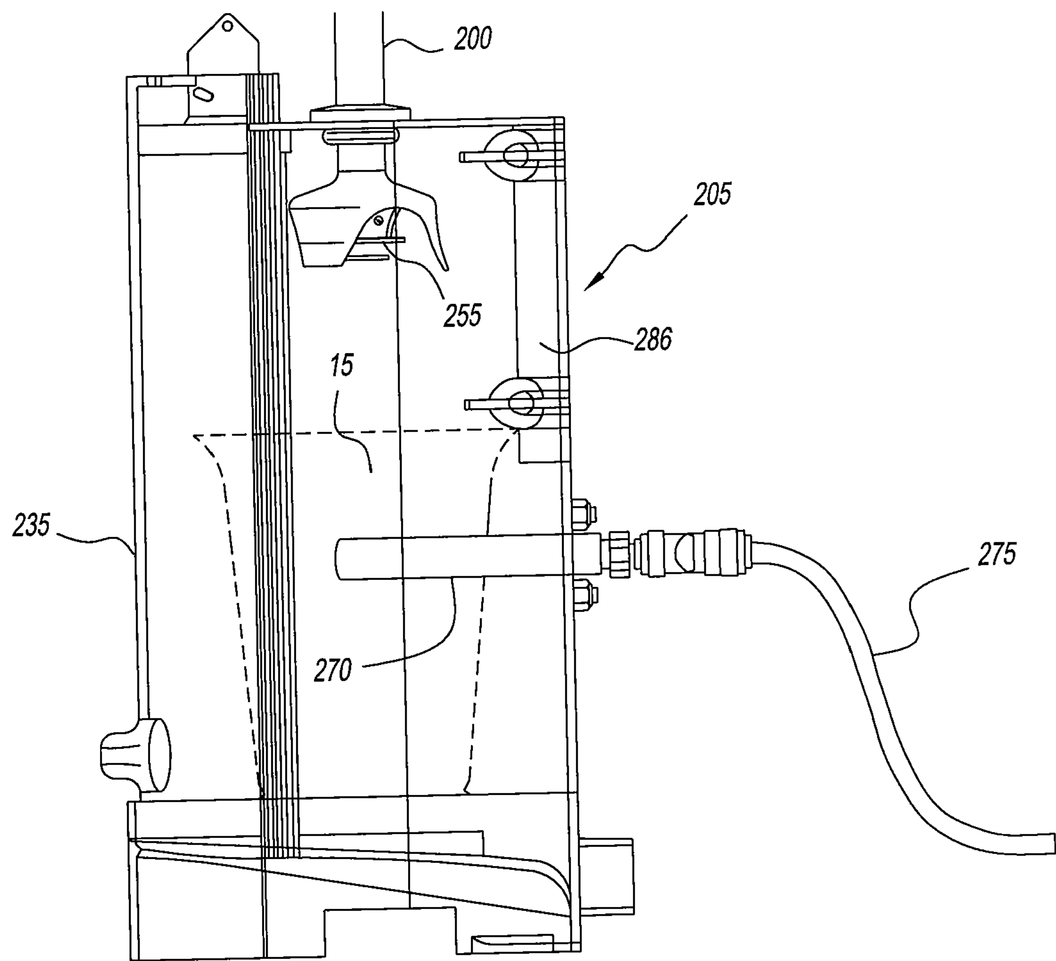
FIG. 17 is a right side view of the blender/mixer/cleaning housing unit according to FIG. 14 with a cleaner snorkel dispensing member.
Figure 21:
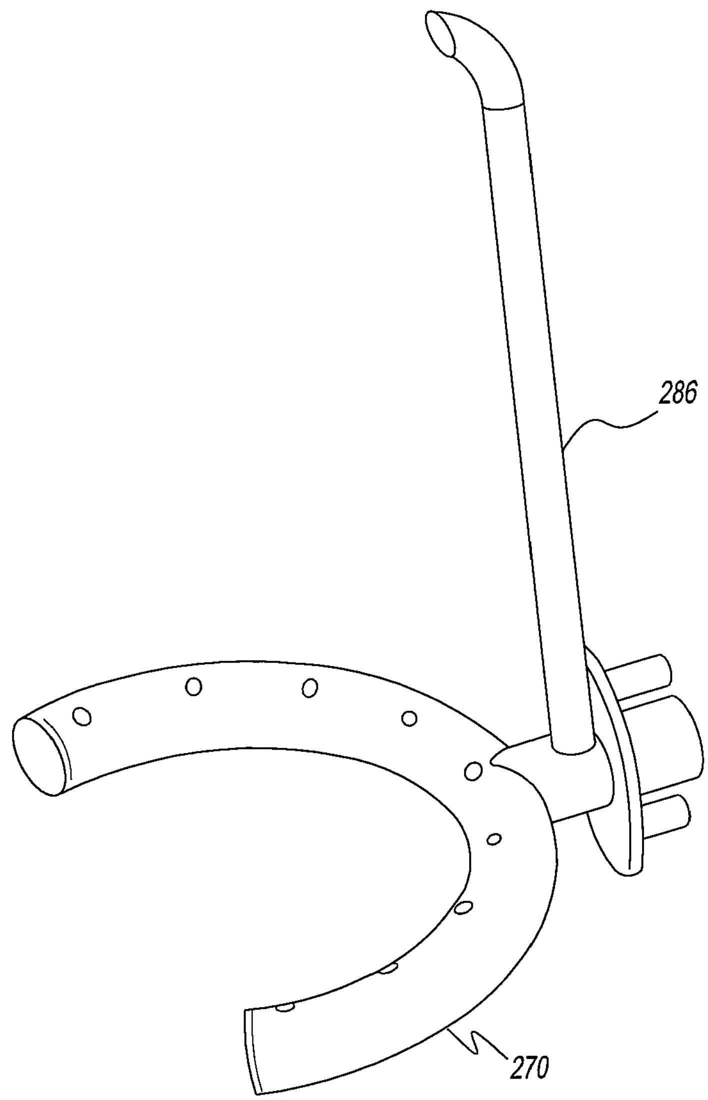
FIG. 21 is a top right side perspective view of the combination serving cup holder and cleaner dispensing unit with the cleaner snorkel dispensing member according to the present disclosure.

Holder 270 may also be connected to a liquid source (not shown) by tubing 275. Tubing 275 may be connected to the liquid source through a solenoid 280. The liquid is dispensed through one or more apertures 272 (shown in FIG. 13) in holder 270 into interior volume 230. The liquid may be water and/or a sanitizer. The water and/or sanitizer drains through drain aperture 227. FIG. 16 depicts a pair of sanitizer supply vessels 281 connected via tubes or conduits 283 to tubes 275, respectively. Preferably, a rinse or cleaning snorkel 286, as shown in FIGS. 17 and 21, is in fluid communication with holder 270 so that cleaning fluid may be dispensed substantially near the top of interior volume 230 of blender housing 205.

After cup 15 is removed from interior volume 230, door 235 may be moved to a closed position so that interior volume 230 and/or blender 245 may be rinsed/cleaned and/or sanitized. Water solenoid 280 and air solenoid 220*a* (FIG. 10) are energized. Blender 245 is energized spinning blender blade 255 and lowered into interior volume 230 by stepper motor 241*a* and linear slide 241. Blender blade 255 is indexed up and down causing rinse liquid to spray entire interior volume 230 or mix compartment. Blender 245 is de-energized stopping blender blade 255 from spinning and returns to the home location. Air continues and is used to help in removal of water residue. Another cup having another beverage therein may be mixed by blender 245.

Blender 245 and interior volume 230 may be rinsed with water only after mixing each beverage, blender 245 and interior volume 230 may be rinsed with water and/or sanitized with a sanitizing liquid, such as, for example, soap or detergent, after mixing each beverage, or blender 245 and interior volume 230 may be rinsed with water only after mixing each beverage and periodically blender 245 and interior volume 230 are sanitized. A "Y" fitting 284 (see FIG. 16) may be placed into a water line 275 upstream of solenoid 280 to connect a source of sanitizing liquid 281. The sanitizing liquid may be metered into the water to sanitize blender 245 and interior volume 230. The amount of sanitizing liquid may be controlled by a flow restriction (not shown) in tubing 283 of the source of sanitizing liquid 281 that connects to the "Y" fitting 284. A solenoid valve may be connected to tubing 283 of the source of sanitizing liquid 281 that connects to the "Y" fitting 284. The solenoid valve may be controlled so as to provide water only to rinse blender 245 and interior volume 230 after mixing each beverage, and to periodically (e.g., daily) add the sanitizing liquid with the water to sanitize rinse blender 245 and interior volume 230. Interior volume 230 and/or blender 245 being rinsed and/or sanitized as described herein after each use prevents flavor transfer, eliminates germs, and eliminates the need for manual washing.

Figure 9:
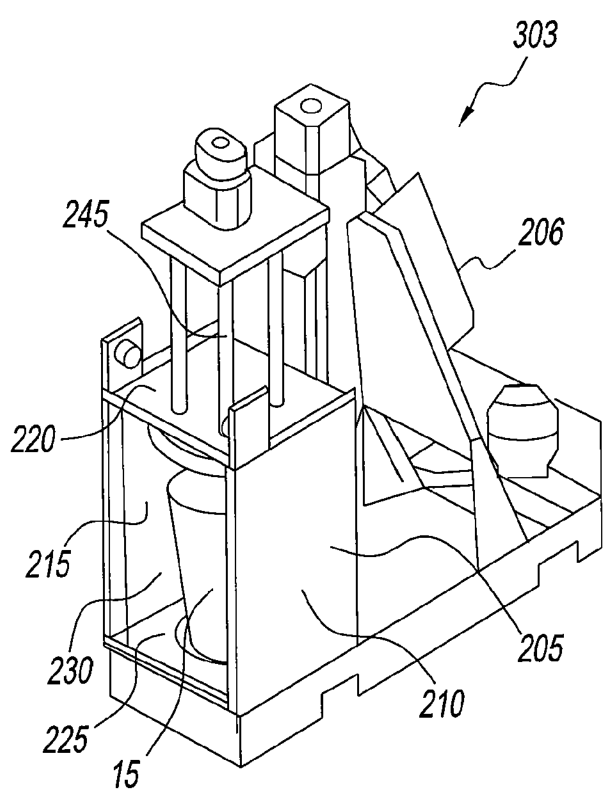
FIG. 9 is a top front right side perspective view of a blender/mixer/cleaning module according to the present disclosure.
Figure 11:
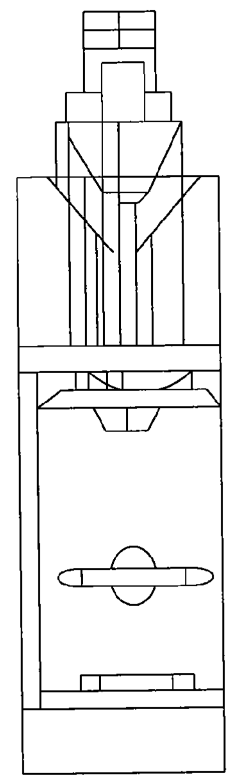
FIG. 11 is a front view of the blender/mixer/cleaning assembly of FIG. 9.
Figure 10:
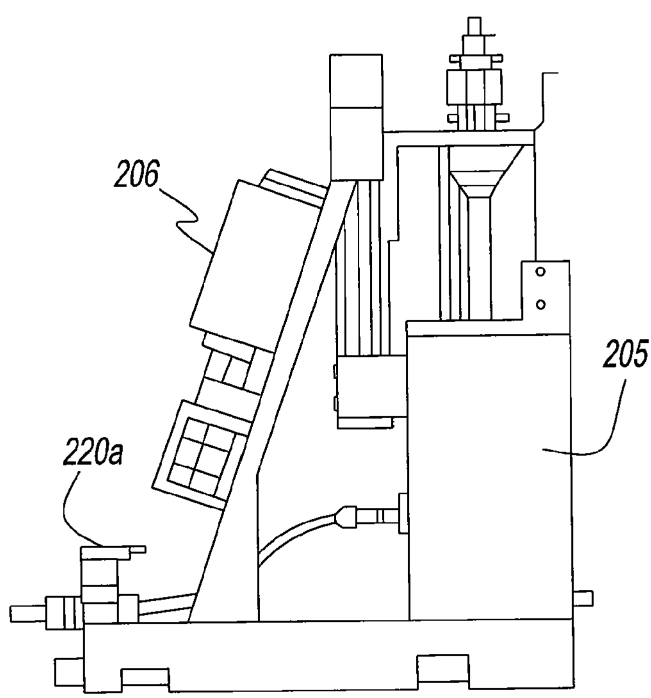
FIG. 10 is a side view of the blender/mixer/cleaning assembly of FIG. 9.
Figure 12:
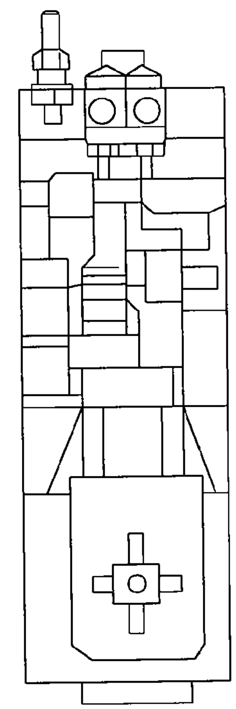
FIG. 12 is a top view of the blender/mixer/cleaning assembly of FIG. 9.

Referring to FIGS. 9, 10 and 13, a controller 206, for example, a printed circuit board, controls blender/mixer/cleaning module 303. When the beverage is dispensed into the cup and placed in blender housing 205, a microswitch, such as microswitch 211, in door 235 is switched indicating the presence of the cup. The control board energizes stepper motor 241 a on linear slide 241 or linear actuator and blender 245 is lowered into the cup to a predetermined level (typically by counting a number of steps that stepper motor 240*a* is operated). When blender blade 255 reaches a pre-determined level the controller energizes blender blade 255 to rotate blender blade 255. Blender blade 255 dwells at the pre-determined level for a time and then linear slide is energized and is lowered further into the beverage to insure proper blending of the beverage. During the mixing blender blade 255 is raised and lowered in a sequence defined by the end user. Upon completion of the mixing process the controller disengages the stepper motor 241*a* and energizes linear slide 241 to remove blender blade 255 from the beverage. The beverage is removed from the mix chamber or interior volume 230 and trips the door microswitch. Upon the switching of the door microswitch the controller begins the rinse process.

Figure 22:
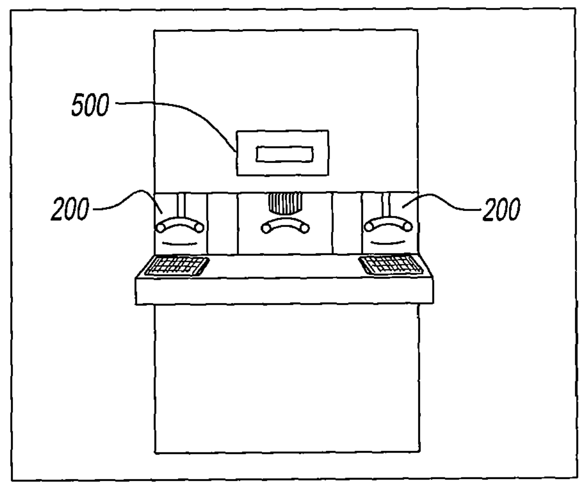
FIG. 22 is a front planar view of an exemplary embodiment of the system according to the present disclosure.
Figure 23:
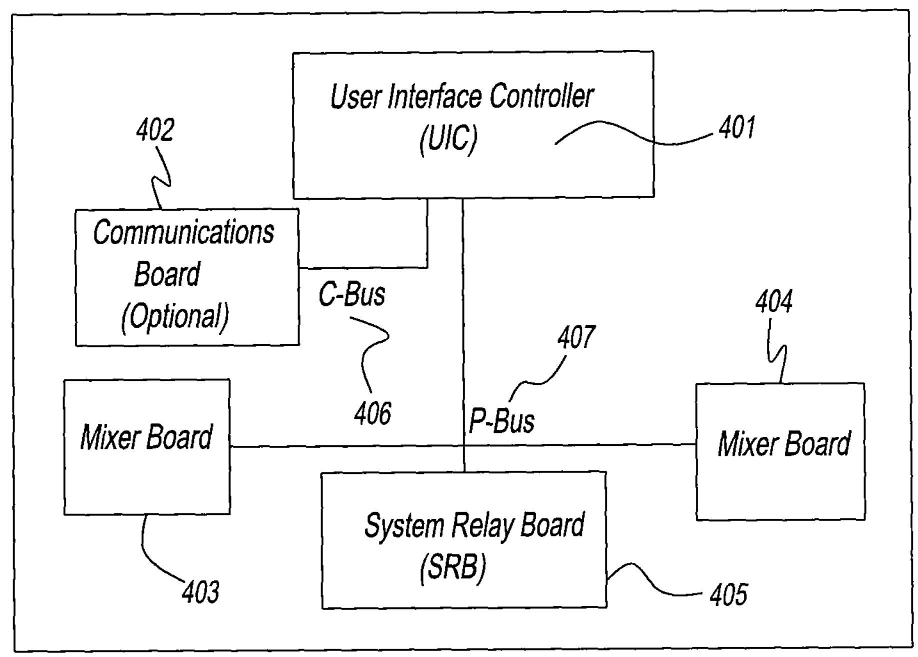
FIG. 23 is a block diagram of an exemplary embodiment of a system according to the present disclosure.

FIG. 23 shows a structure of control boards identifying that they are separate but interconnected. This provides flexibility in the design allowing additional boards to be added without re-designing the entire controller. FIG. 23 shows a user interface controller 401 that incorporates a button panel, such as a control panel 500 shown in FIG. 22, that an operator uses to select the drink as well as a computer that interconnects to other control boards. A communications board control board 402 provides a gateway for communication to various methods (web, modem, USB, and the like.). Mixer boards 403 and 404 are mixer control boards that contain logic controllers for the operation of mixer blender blade 255 and linear slides 240. Smart relay board 405 is a control board that houses switching relays for ice maker, ice storage and portion control module 300, flavor/ingredient dispensing module 1100, mixer spindle motor 240, linear slides 241, water solenoid 280, and air solenoid 220*a*. C-bus 406 is a communication interconnect. P-bus 407 is a wiring interconnect between boards.

Figure 24:
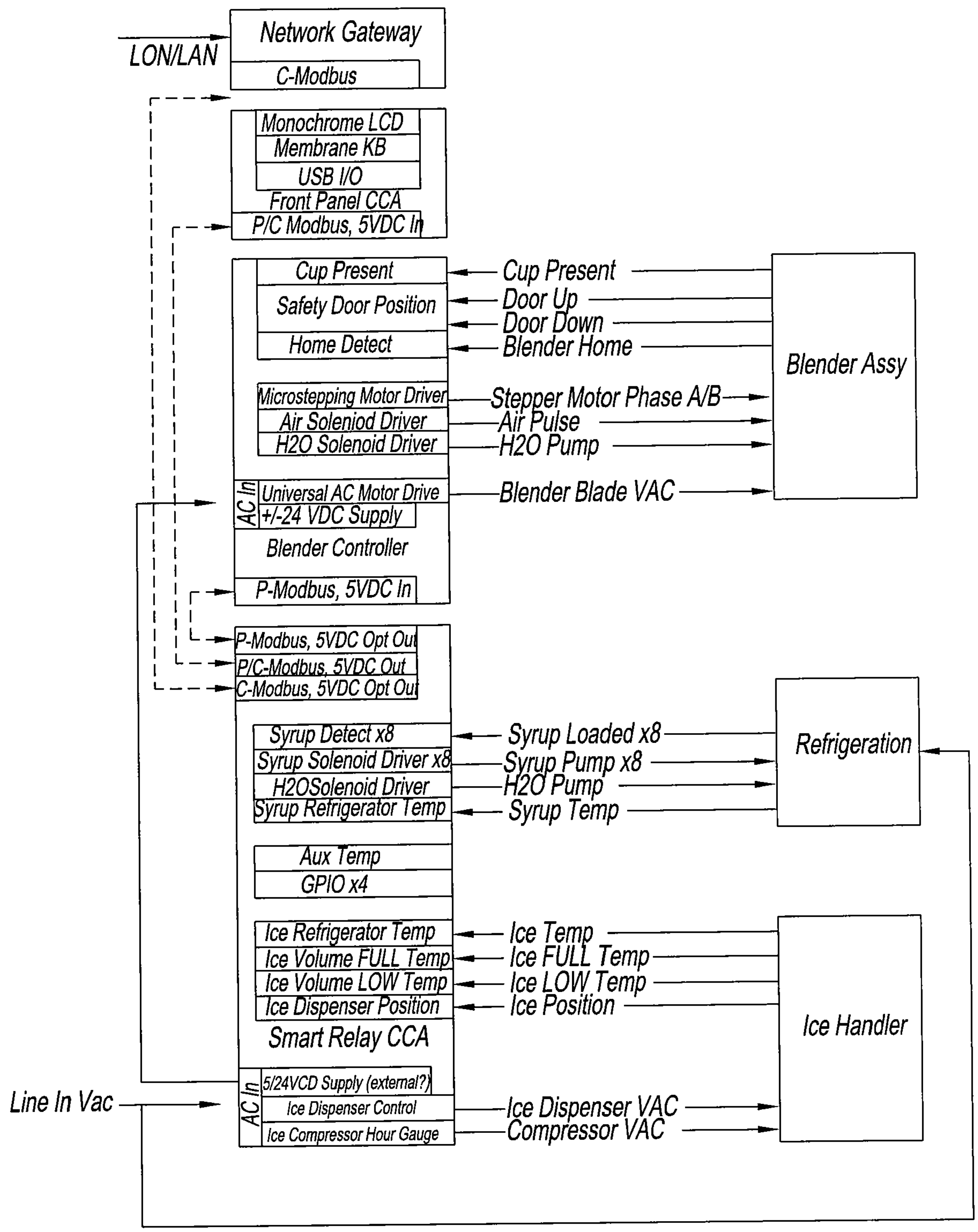
FIG. 24 is a block diagram of the network gateway, front panel display controller, blender/mixer and cleaner module controller and ice making and portion controller according to the present disclosure.
Figure 25:
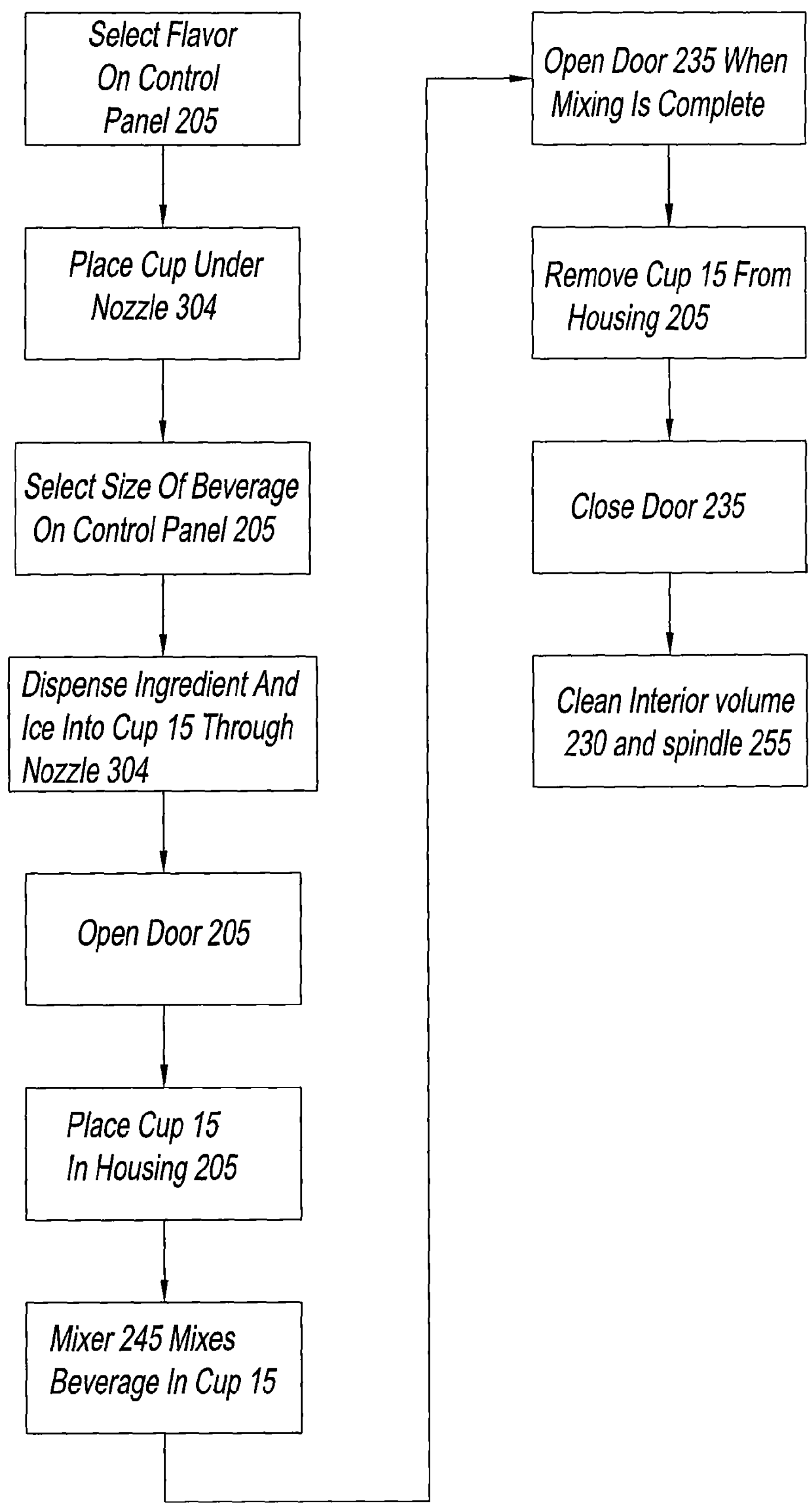
FIG. 25 is a process flow diagram of an exemplary embodiment of a method for dispensing, blending/mixing and cleaning according to the present disclosure.

FIG. 24 is block diagram showing inputs and outputs of assembly 100. Network Gate C modbus Communication module that allows communication via modem, internet, and the like. Front Panel CCA User interface that includes Monochrome LCD, Membrane KB and USB i/o. Blender controller receives sensor input from blender/mixer/cleaning module 303 that determines the presence of cup 15, the home location of the spindle, and contains control logic for initiating mixer motor and linear drive motor, water and air solenoid signals. Blender controller has a controller for handling control of refrigeration system including syrup solenoid driver, water solenoid driver, syrup bag presence detection, and syrup temperature. Blender controller has additional capabilities of monitoring temperature of ice, level of ice in bin, low temperature alarm, and dispenser position.

Referring to FIG. 7, in use, cup 15 is placed on container holder portion 20 of assembly 100. Ice maker, ice storage and portion control module 300 dispenses ice to cup 15 through nozzle 304 and ingredient dispenser assembly 1100 dispenses an ingredient, such as, for example, a fruit base to cup 15 through nozzle 304. Cup 15 is then transferred into interior volume 230 of blender/mixer/cleaning module 303. Door 235 is moved to the closed position and blender 245 mixes the ice and fruit base. Upon completion of the mixing, door 235 is moved to the opened position and cup is removed and delivered to the consumer. Door 235 is then closed and interior volume 230 is rinsed and/or sanitized.

Each beverage may be mixed in a single serving cup 15 that is served directly to a consumer, allowing the entire beverage to be delivered to the consumer raising product yield and reducing wasted beverage, e.g., when blending the beverage in a blender pot. Having each beverage blended in its own cup improves flavor control and reduces allergy issues caused through cross-contamination.

It has been found by the present disclosure that assembly 100 allows operators to produce and dispense consistently prepared smoothie drinks in less than 40 seconds. Advantageously, assembly 100 generates ice through a fully integrated on-board ice system, ice maker, ice storage and portion control module 300. Ice maker, ice storage and portion control module 300 may, for example, have a 20-pound ice storage system that has the capability to create an additional 10 pounds of ice each hour, with a peak total of 270 pounds per day. Having ice generation on board removes the risk of injury through slips and falls, and it decreases the chance of bacterial contamination through mishandling. Additionally, the ice used in this machine is nugget-style ice, which is easier to fracture and blend down into the smoothie consistency. All of this allows for a perfectly blended beverage, for example, smoothie that fits within a normal QSR delivery time.

Each beverage, for example, smoothie is blended in its own cup, allowing the entire beverage or drink to be delivered to the customer and, in turn, raising product yield. Having each drink blended in its own cup improves flavor control and reduces allergy issues caused through cross-contamination. Assembly may, for example, consistently provide twenty 16-ounce drinks per hour and, at peak capabilities, forty-five 16-ounce drinks for one-hour bursts. Money is also saved through the elimination of small wares or blender pots that were purchased and stored by restaurant owners in the past.

Advantageously, spindle assembly 242 goes through a rinse and sanitation process after each use to prevent flavor transfer and eliminate the need for manual dishwashing. Additionally, for example, two mixer modules included in assembly 100 to allow for the creation of a second drink while mixing the first, contributing to higher drink output and, consequently, to the bottom line of the operation. To overcome this challenge, nugget-style ice may be used with assembly 100. Nugget ice is softer than the more commonly known cube ice, and it is formed in a freeze barrel with an internal auger that continually scrapes the freeze surface. This flake-style ice is moved to the top of the freeze barrel by the ice auger, where it is extruded into the ice nugget. The resulting smaller ice greatly reduces the amount of blending required to create the drink. Additionally, the noise generated from the blending process is reduced by using this smaller nugget ice. This becomes especially important when the equipment is placed in the proximity of the front counter or near a drive-through window.

The blender pots in current smoothie machines are designed to fully mix the drink and grind the ice to a grain size that meets customer taste profiles. When mixing in a cup, there is no geometry to assist the mixing and grinding of the ice. To achieve the proper drink consistency, linear slide 241 moves blender blade 255 up and down in cup 15. This process simulates how a drink is made using a handheld stick mixer. Blender blade 255 lowers into the drink (about 25%), at which point blender blade 255 is energized. Once engaged, the spindle is lowered fully into the cup and allowed to dwell. This process grinds the majority of the ice, but at that point, the drink is not fully developed. The spindle is then raised and lowered following a profile created for the specific drink, taking into account the viscosity of the fluids, ice-to-fluid ratio, and the drink cup size.

It has been found by the present inventors that size limitations (footprint) may be achieved by a configuration of the components of assembly 100. While a traditional machine creates drinks in a blender pot to mix more than one flavor, assembly 100 dispenses and mixes each drink in a serving cup, and may have dual spindles to maintain throughput and delivery times. Assembly 100 may address size requirements by vertical placement of the components.

Assembly 100 may maintain the accuracy of blender 245—used to create drink consistency—by stepper drive motors 241 a control the linear slides 241. Stepper motors 241 a provide the ability to create different blending profiles for the various types of drinks (coffee-based, fruit-based, fruit-plus-yogurt drinks). Counting the number of steps that stepper motor 241*a* travels allows precisely locating blender blade 255 every time a drink is blended.

Blender pots that are currently used are made of hard plastic, with the ability to withstand the forces used to crush ice into an acceptable consistency for a smoothie drink. Grinding the cube-style ice, most commonly found in QSRs, would put too much stress on the machine's blender and the customer's cup.

Definitions, acronyms, and abbreviations may include:

| Abbreviation | Definition |
|---|---|
| UIC | User Interface Controller |
| SRB | System Relay Board |
| P-BUS | Peripheral bus |
| C-Bus | Communication Bus |
| CCA | Circuit Card Assembly |
| SFR | System Functional Requirements |

Referring to FIGS. 22 and 23, assembly 100 may be a "Smoothie maker system" that consists of an integrated ingredient dispensing unit, up to 4 mixing units (expandable from 2 in normal configuration), and a control panel for user operation.

As depicted in FIG. 24, the system is designed using a Smart Relay CCA, two mixer CCAs (normal configuration), an optional communications board for external communications, and a user interface controller board. All of the subsystem boards communicate with each other using a MODBUS protocol and RS-485 physical link.

Smart Relay CCA is responsible for dispensing control, monitoring and safety of the system ice-maker, and flavoring assembly/subsystem. Also the Smart Relay CCA provides the power and Modbus hub for the Smoothie System control electronics.

The Blender Controller CCA is responsible for position, speed, cleaning and safety control of the system blender module/subsystem, such as blender/mixer/cleaning module 303. It controls the blender blade, water and air pumps and senses cup present and door switch.

The user interface controller board consists of a monochrome LCD display, membrane keypad for control and configuration.

Referring now to FIGS. 22-28*b*, functional requirements of an exemplary embodiment of the present disclosure are shown and described.

The system shall have method for configuration for the following:

1. Mixing profiles
2. Particular fluids selections (x out of 254 displayed)

The system shall automatically go into a configuration download menu if in idle when a SD card is inserted The User Interface shall have a degrees F/C selection for temperature display in the setup mode.

Dispenser Flavor(s)

The maximum Number of Flavors per Serving shall be 3

The minimum Number of Flavors per Serving shall be 1, unless dispensing ice only A flavor selection status shall be toggled by pressing the button corresponding to the flavor in question Upon reaching the maximum Number of Flavors per Serving, the system shall not allow selection of any additional flavors; unselected flavors become locked-out The user shall be able to change the flavor selection(s) by pressing the CANCEL button and selecting desired flavor(s)

The user shall be able to change the flavor selection(s) by first de-selecting a (the) flavor(s), then selecting the desired flavor(s)

Unit shall monitor use cycles of flavors and provide a user indication on the display of low level for each flavor for early warning of flavor out.

Dispenser Additive(s)

The additives consist of a selection of 2 types of fresh fruit and yogurt. Only the yogurt is dispensed automatically; instead of dispensed, the fresh fruit has to be manually added. The fresh-fruit selections are used to compute the amounts that are dispensed. Fruit is placed in cup prior to receiving the ice and fruit.

The Maximum Number Of Selectable Additives shall be 3

The Minimum Number Of Selected Additives shall be 0

Refrigerated Base (Flavor Storage)

The Fruit flavors and yogurt shall be stored in a refrigerated base designed to maintain a product temperature between 34° F.-38° F.

Base will be designed to accommodate up to 8 flavors (6 flavors is default for general market).

The base design will be such that flavors can be stored in Mylar "bag-in-box" packaging The base will house flavor pumps (up to 8) and all associated delivery tubing, and air solenoid switches The base will be designed to intake and discharge condenser air from the front of the unit The base dimensions will be: 26" w×33" d×32" h The base will be mounted on castors to allow access to rear of unit for cleaning The base will be designed to meet NSF and UL requirements.

The base will have openings in top to allow tubing to pass into dispense area

The base will provide a method air delivery and return to dispenser section to maintain product temperature to the dispense nozzle (per NSF)

The base refrigeration system will require 120 v AC with the option for 220 v/50 hz (Europe requirement)

Ice Making

Smoothie machine will have on-board ice making capabilities

The device shall have ice machine capability to store 9 kg of ice in addition to ice making capabilities The ice machine shall generate hard nugget ice The ice machine will have the capability to generate a minimum of 240 lbs of ice per day The ice machine will be designed to operate on 120V 60 hz+/−10%

The ice machine shall have provisions for 220 50 Hz operation for Europe+/−10%

Ice Dispensing

Ice is normally dispensed during the smoothie making process but could also be dispensed exclusively.

The system shall allow dispensing of ice in an exclusive manner (i.e. without flavors or water)

Ice shall be dispensed in a portion amount that allows scaling for various drink cup sizes Ice amount shall be dispensed with an accuracy of ±10%

The system shall provide a button for ice only dispensing

Upon selection of the ice-only button, the system shall proceed to cup size selection The ice-only button shall only be available when no flavors are selected. Conversely, upon selection of a flavor the ice-only button shall be disabled There shall be a Service maintenance mode to allow cleaning on the dispenser fluid lines Cup Size Selection The system shall allow cup size selections of small, medium large, and extra large, with a provision for additional cup sizes determined by customer Provisions will be made for cup storage on the unit Cup size selection shall trigger the dispensing process There shall be up to five configurable cup sizes with configurable volumes.

Cup shall be placed under dispense nozzle prior to drink selection (no UI to tell you)

Dispensing

The dispensing process shall use the cup size as a scaling factor to compute ingredient amounts; water, ice and selected flavors/additives The ingredients and quantities dispensed shall be used to determine the mixing profile Fruit flavor ingredients shall be delivered using air driven condiment pumps Condiment pumps shall be located in the refrigerated space Condiment pumps shall be removable for easy access for service Condiment pumps shall be energized using solenoid valves mounted in the air flow to the pumps Condiment Pumps shall deliver a portioned amount of flavor with an accuracy of ±10%

The amounts of ingredients used for each smoothie including a total of 8 flavored fluids, water, ice and up to 2 manually added types of additives shall be determined by the Dispense Algorithm.

Mixing

The mixing process includes the actual mixing of the ingredients in a cup and a subsequent cleaning cycle to ensure that the blender's blades are clean for the next mixing cycle.

The mixing operation shall be asynchronous to the dispensing operation

The mixing operation shall be determined by the current mixing profile and shall take no longer than 20 seconds.

The mixing operation shall consist of 2 steps, blending & washing

The mixer shall be designed as a module that attaches to the ice machine and refrigerated base The mixer module shall consist of a mixer spindle, blade, a linear slide, cup holder with water nozzles To access the mixer module a protective door must be raised The mixer module door shall contain micro-switches to locate the door position and to provide a lockout Mixer Sequence of Operation The drink is placed into the cup holder and the door is closed.

When the closure of the door has been identified the mixer shall begin the mixing process.

The mixer spindle shall index (via linear slide) down into the drink cup 2.5 inches from home position After initial contact the mixer blade shall be energized The spindle shall dwell at the initial engagement point for a period of 3 seconds.

The spindle shall then index into the drink to a depth of cup of approximately 75%.

The spindle shall dwell in this location for a period of 15 seconds.

The spindle shall then return to the initial location and continue to mix for a period.

Upon completion the mixer blade shall be de-energized and the spindle returned to its' home location.

The door is then opened and the drink is then removed and served

Blender/Mixer Cleaning Process

After the mixer sequence the module shall begin the cleaning process when the mixer door is closed.

The cleaning process shall start with the spindle being lowered into the mixing cavity and the spindle blade energized.

A water solenoid shall be energized for 3 seconds and begin to spray rinse the spindle and cavity after the spindle blade is energized during a mixer cleaning cycle.

An air solenoid connected to the water line shall be energized to provide a high pressure blast of water during the mixer cleaning cycle.

The module shall be designed to operate with sanitizing agents in addition to water.

The unit shall be able to detect run out of sanitizer fluid.

When the mixer cleaning cycle has ended, the solenoids are de-energized and rinse water is drained.

The mixer cleaning cycle shall take no longer than 5 seconds.

Blending/Mixing Profile

A mixing profile determines the steps to be performed during the mixing operation. Each step in the mixing profile specifies spindle's speed and time (how fast for how long) as well as position (with dwell time).

A normal and Additive included mixing profile shall be available for each cup size.

When a non-dispensed-additive is selected, the mixer shall use the Additive mixing profile When NO non-dispensed-additives are selected, the mixer shall use the normal mixing profile The mixing profiles shall be customer configurable.

User Interface Controller (UIC)

Display use shall be OPTREX F-51851GNFQJ-LY-AND or equivalent

The UIC shall support handling of USB storage devices formatted with FAT16.

The UIC shall be capable of connecting to the C-Bus

The UIC shall provide 1-press on-the-fly language switch

The UIC shall be the P-Bus master

System Relay Board

Power-Up

The relay board shall be responsible for determining the system configuration including fluids loaded and number of blenders and relaying to the Blender control board Blender Control Board Peripheral Bus (P-Bus The peripheral bus or P-Bus shall connect the User Interface Controller to the system's peripherals (the System Relay Board and the Mixer Control Boards)

Physical Layer

The peripheral The P-Bus shall use RS-485.

The User Interface Controller shall be the bus master (client).

Protocol

The P-Bus shall use ModBus RTU.

Communication Bus (C-Bus)

Physical Layer

Protocol

User interface and Configuration/Setup Modes

Product Mode.

System Setup Mode

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An integrated beverage blending and cleaning system comprising:
at least one blender module comprising a housing, a spindle, a blade and a cleaning assembly, said housing comprising a substantially vertically disposed wall, a bottom, a drain, and a container access door disposed in said substantially vertically disposed wall; and
a controller which, upon completion of a blending or mixing sequence, removal of said beverage container from said housing and returning of said container access door to a closed position, automatically activates a cleaning and/or sanitizing mode via said cleaning assembly to clean at least an interior of said housing.

2. The system according to claim 1, wherein said blender module further comprises: a container seal disposed about said spindle which is capable of sealing said beverage container during blending and/or mixing, as well as preventing said beverage container from rotating thereabout; and a container holder.

3. The system according to claim 1, wherein said cleaning assembly comprises a water source and/or at least one cleaning and/or sanitizing solution source, wherein said water source and/or said cleaning and/or sanitizing solution source are connected to at least one orifice disposed within said housing for cleaning and/or sanitizing at least said interior of said housing, said spindle, said blade and said container seal after use.

4. The system according to claim 1, wherein said blender module includes a variable speed motor to rotate said spindle and said blade in a radial direction.

5. The system according to claim 1, wherein said blender module further comprises a variable speed and direction motor to move said spindle and said blade.

6. The system according to claim 1, wherein said door is sealingly disposed about said housing, thereby substantially preventing water and/or cleaning and/or sanitizing solution from passing through said door during said cleaning and/or sanitizing mode.

7. The system according to claim 3, further comprising a container holder, wherein said container holder comprises at least one arm disposed about said beverage container and a plurality of orifices disposed thereon, wherein water and/or cleaning and/or sanitizer solution provided from a water and/or cleaning and/or sanitizer solution sources is/are dispensed via said orifices into said housing.

8. The system according to claim 7, wherein said dispensing of water and/or cleaning and/or sanitizing solutions is/are dispensed under pressure.

9. The system according to claim 3, further comprising a container folder, wherein said cleaning assembly further comprises a vertically disposed conduit in fluid communication with said container holder, whereby water and/or cleaning and/or sanitizing solution from said water and/or cleaning and/or sanitizing solution sources is/are dispensed at the top portion of housing via the distal end of said conduit disposed opposite said container holder.

10. The system according to claim 3, wherein said water source comprises: a water storage container, at least one valve and at least one water conduit connecting said water storage container to said orifices under pressure.

11. The system according to claim 10, wherein said cleaning and/or sanitizing solution sources further comprises: a cleaning solution storage container, one or more valves and at least one cleaning and/or sanitizing solution conduit connecting said cleaning and/or sanitizing solution source to said one or more orifices under pressure, wherein said water conduit and said cleaning and/or sanitizing solution conduit are connected to an inlet of said one or more orifices via a fitting disposed downstream of said water source and said cleaning and/or sanitizing solution source.

12. The system according to claim 1, wherein said spindle and said blade are reversible so as to both blend said ice and said at least one ingredient when said spindle and blade are rotated in one direction and mixing into said beverage said at least one mixin when said spindle and blade are rotated in a second direction.

13. The system according to claim 1, wherein said blade is an emulsifying blade.

14. The system according to claim 2, wherein said container seal comprises a lid portion and at least one alignment member, and wherein said container seal moves in a substantially vertical direction together with said spindle and said blade such that said lid sealingly engages a top portion of said beverage container, thereby preventing said ice and said other ingredients from splashing outside of said beverage container and preventing container rotation or other unwanted movement during the blending and/or mixing process.

15. The system according to claim 1, further comprising a linear slide and stepper motor which move said spindle and said blade in a substantially vertical direction.

16. The system according to claim 15, wherein said controller counts a number of steps that the motor travels allowing precise location of said blade within said beverage container, thereby allowing said ice and said at least one other ingredient to blend throughout said beverage container providing a uniform beverage each time a beverage is blended and/or mixed in said blender module.

17. The system according to claim 1, further comprising a safety switch in proximity with said door which disengages said blade when said door is opened.

18. The system according to claim 1, further comprising a device in proximity with said door which will prevent said door from being opened when said spindle and/or said blade is engaged.

19. The system according to claim 1, further comprising a sensor which indicates the presence of said beverage container in said blender module.

* * * * *